United States Patent [19]
Shirley, Jr. et al.

[11] 3,903,333
[45] Sept. 2, 1975

[54] PRODUCTION OF SLOW RELEASE NITROGEN FERTILIZERS BY IMPROVED METHOD OF COATING UREA WITH SULFUR

[75] Inventors: Arthur Ray Shirley, Jr.; Robert S. Meline, both of Florence, Ala.

[73] Assignee: Tennessee Valley Authority, Muscle Shoals, Ala.

[22] Filed: Mar. 8, 1974

[21] Appl. No.: 449,322

Related U.S. Application Data

[63] Continuation-in-part of Ser. No. 346,711, March 30, 1973, abandoned, which is a continuation-in-part of Ser. No. 268,520, July 3, 1972, now Defensive Publication No. T912,014.

[52] U.S. Cl. .................. 427/212; 71/28; 71/64 F; 118/19; 118/303; 118/418; 260/555 C; 260/555 S; 427/242; 427/316; 427/346
[51] Int. Cl.² .................. B05D 7/00; C05C 9/00
[58] Field of Search .......... 117/100 A, 109; 118/18, 118/303, 418, 19; 71/28, 64 F; 260/555 C, 260/555 S; 427/212, 242, 316, 346

[56] References Cited
UNITED STATES PATENTS

| | | | |
|---|---|---|---|
| 2,761,420 | 9/1956 | Mottet | 118/418 |
| 3,101,040 | 8/1963 | Lanz | 118/19 |
| 3,285,223 | 11/1966 | Sahlin | 117/109 |
| 3,317,307 | 5/1967 | Wise et al. | 117/109 |
| 3,348,262 | 10/1967 | Heian | 118/418 |
| 3,573,954 | 4/1971 | Yamamoto | 117/109 |
| T912,014 | 7/1973 | Shirley et al. | 117/100 A |

*Primary Examiner*—Michael Sofocleous

[57] ABSTRACT

A process for applying a precisely uniform solid coating of fluid material onto solid substrate particles where in one embodiment the surface of the substrate material is smoothed by superficial fusion and rolling in a rotary drum, and multiple, thin, concentrically formed layers of the coating material are applied by cascading the substrate particles beneath a plurality of sequentially applied, closely controlled pneumatic sprays of the coating material in a rotary drum. In a second embodiment, hydraulic spray nozzles are utilized in a manner wherein the requisite preheating is not required. Special operating conditions are specified which allow the production of a slow-release fertilizer coated only with sulfur. Proper temperature control is maintained during the process to assure that the sulfur solidifies in the proper crystalline structure to impart significantly improved tensile strength characteristics to the coating. Each embodiment has characteristically different operating conditions, specifically temperatures, which result in decisively different coating characteristics.

12 Claims, 9 Drawing Figures

PRODUCTION OF SLOW RELEASE NITROGEN FERTILIZERS BY IMPROVED METHOD OF COATING UREA WITH SULFUR

The invention herein described may be manufactured and used by and for the Government for governmental purposes without the payment to us of any royalty therefor.

This application is a continuation-in-part of our co-pending application Ser. No. 346,711, filed Mar. 30, 1973 (now abandoned), which in turn is a continuation-in-part of our application Ser. No. 268,520, filed July 3, 1972, both for COATING PROCESSES, which application Ser. No. 268,520 was published July 24, 1973, as Defensive Publication T912,014.

Our invention relates to an improvement in quality of granular or other particulate materials coated with slurries, melts, or solutions and new improved equipment and procedures for production of such materials. The highly uniform and effective coatings applied by the procedures and techniques disclosed herein may be either of the same, or different, composition as the granular substrate material or, if desired, multiple coatings with two or more layers of different materials may be applied consecutively and uniformly in the desired proportions. Our process, procedures, and equipment are particularly well suited for applying highly uniform coatings or encapsulations onto fusible, water-soluble fertilizer salts or related material, but application of our invention is not intended to be limited only to processing materials of this type.

In particular, our invention relates to a continuous process for applying sulfur to urea granules to produce a slow-release nitrogen fertilizer consisting only of a coating of commercial-grade sulfur on commercial-grade granular urea. The process and the product are completely different from all other prior-art slow-release nitrogen fertilizer processes and products, including those previously called sulfur-coated urea. By every prior-art process which produces a sulfur-coated slow-release fertilizer, at least one additional coating, and more generally two or three additional coatings, of other substances must be applied to the urea either before and/or after the sulfur is applied. Further, in some of these prior-art processes, a plasticizer must be added to the sulfur to improve its coating properties. Our process uses absolutely no other substances besides sulfur and urea. We reported our early work on this process in our grandparent U.S. application Ser. No. 268,520, filed July 3, 1972 (now Defensive Publication T912,014). It was shown therein that we could produce a fertilizer using only sulfur and urea that exhibited slow-release nitrogen characteristics in water dissolution testes. However, at that time the parameters and their limits which allowed us to produce this material were not fully known. In our parent application, to wit, Ser. No. 346,711, filed Mar. 30, 1972, we included our early work along with more detailed elaboration on our process variables and conditions as determined in more recent work. Early in our work we found the importance of the proper preparation of the urea granules to receive a sulfur coating and the absolute dependence on the quality of the coated product on the sulfur application equipment. We designed equipment to ensure optimum results from both processing steps. Because of the extreme importance of these two processing steps in producing a slow-release urea coated with sulfur only, the unique urea preheater and the sulfur spray header and their operating parameters were fully presented.

In this application, which in turn is a continuation-in-part of Ser. No. 346,711, supra, we teach that a slow-release fertilizer, urea coated only with sulfur, can be made by using hydraulic pressure atomizing nozzles to spray the sulfur. The maximum nitrogen content of the final product is somewhat reduced when the sulfur coated urea is produced with hydraulic nozzles instead of pneumatic atomizing nozzles, as in our previous work, but some producers will find that our newest process embodiment is more desirable than the embodiment we taught in our earlier applications and will prefer to use it. Process temperature limits are lowered to the point where the material can be produced without any preheating although some preheating is required for best results.

The production capability of a given size sulfur coating unit is increased by 400 percent. Tremendous reductions in sulfur dust are also obtained by this newest process embodiment, thus preventing sulfur buildups on equipment, reducing air pollution problems and eliminating the possibility of sulfur dust explosions. Quick cooling is still optimal, as in the parent applications.

For the sake of continuity, the present application repeats the results reported in our earlier applications, as well as the results of our most recent work.

It has long been known how to provide coatings of various natures on particulate fertilizers, particularly water-soluble fertilizers of a hygroscopic nature. For example, Mason (U.S. Pat. No. 3,205,061) teaches that urea can be covered with molten wax which is then cooled to solidify the coating. Housen (U.S. Pat. No. 3,264,089) relates to the use of urethene resin to coat soluble fertilizers. Fox (U.S. Pat. No. 3,372,019) teaches the use of wax resinous mixtures on fertilizers. Such coatings are applied to enhance the physical or agronomic properties of the finished product, and the coatings sometimes serve multiple functions. Some granular fertilizers are produced by adding successive layers of concentrated solutions or melts of soluble fertilizer salts onto undersize particles of the same, or different, composition in various types of granulating devices. Homogeneous granular products, such as urea, ammonium nitrate, diammonium phosphate, nitric phosphate, and related fertilizers are produced by this procedure. Granular, multinutrient grades are produced by coating small granules or prills of materials such as ammonium nitrate with layers of ammonium phosphate or other material. Such products not only have good agronomic properties, but they have superior physical properties because the less hygroscopic material is on the surface of the granules.

Hygroscopic fertilizers are commonly coated with water resistant sealants, such as oils, waxes, and other organic materials, to reduce moisture absorption and subsequent caking of the individual particles.

In more recent developments, highly soluble fertilizer materials have been coated with water-impervious materials to provide for controlled release of plant nutrients to the soil. It is well known the fertilizers having slow or controlled release of nutrients have definite agronomic and economic advantages, as well as ecological advantages, provides such fertilizers can be produced at reasonable costs. In general, the use of slowly soluble or controlled-release fertilizers prevents early leaching losses, seedling damage, luxury absorption of nutrients by the plants during early growth, and subsequent nutrient deficiencies as the crop approaches maturity. Also, the use of controlled-release fertilizers reduces the probability of fertilizer injury to growing crops and eliminates the need for supplemental applications during the growing season. Also, leaching of soluble fertilizer salts might, under some circumstances, allow the nutrients to contaminate surface drainage and ultimately contribute to pollution of streams. The major disadvantages of coated fertilizers prepared by prior-art procedures have been the relatively high cost of the coating materials and quantities required to give the desired controlled-release characteristics and the manufacturing difficulties peculiar to this type of operation. Uniform coating of each individual particle has been difficult to achieve for a number of reasons. Individual fertilizer particles usually have rough surfaces with protruding crystals that are difficult to cover completely with a reasonable amount of coating materials. Also, nonuniformity of particle size distribution common in commercial fertilizers has made uniform coating difficult to attain with large-scale equipment by previously disclosed procedures. Uniform coatings are essential since a small imperfection in the coating allows the fertilizer to diffuse rapidly into the moist soil, and the fertilizer will lose its controlled-release characteristics. The coating application must be a process which is readily adaptable to high tonnage production because fertilizers are used in large amounts and must be relatively low cost to be competitive with conventional fertilizers. Materials that have previously been tested as coating agents for controlled-release fertilizers include various synthetic polymers, waxes, oils, paraffin compounds, asphaltic mixtures, sulfur, and combinations of two or more of these materials. In most cases, an additional coating of a dry conditioning or parting agent has been required to prevent the coated products from being sticky and difficult to handle in conventional equipment. In the past, TVA and others have had some success in preparing controlled-release fertilizers by applying a primary coat of molten sulfur onto water-soluble fertilizer particles and sealing the cracks or fissures in this primary coat with a secondary coat of wax or other sealant.

The various coated products made by known prior-art procedures and methods have displayed serious deficiencies and disadvantages, particularly if produced on a large scale. Products with effective and uniform coatings have required elaborate procedures with resulting low production rates, and inherently high operating costs or excessive quantities of the coating material are required or else the coatings are nonuniform and ineffective.

In our earliest work, we discovered methods and procedures and devised equipment for a continuous process for coating particulate materials with slurries, solutions, or melts in an unusually uniform and effective manner and overcame most of the deficiencies inherent in prior-art procedures. Our process provides the coating uniformity and precision required, for instance, in making pharmaceutical products, and at the same time it is adaptable to large-scale production of uniformly coated products at very reasonable costs. Further, our process is particularly well suited for use in manufacturing fertilizers of the classes that can be produced by adding successive layers of slurries, solutions, or melts onto small particles of the same, or different, composition to form spherical, product-size granules or for coating product-size granules with suitable materials to improve the physical or agronomic properties of the product.

In our earliest work, we demonstrated results of our process and equipment in large pilot-plant operation; sulfur coating urea at the rate of 0.5 to 2 tons per hour.

Our process developed in this earliest work, which can be used for a wide number of specific applications, comprises the following steps:

1. substrate pretreatment step for preparing surface of particles to receive later coating or encapsulation of the particles;
2. primary coating operation in which the substrate particles are moved rapidly beneath sprays of coating material which is accurately metered to each spray nozzle and dispersed at a uniform spray density;
3. secondary coating or sealant application, if required, to the product from the primary coating operation;
4. cooling the coated product;
5. conditioning the cooled product, if required, for storage.

However, more recent findings and better determination of parameters since our earliest work, as reported in our parent application Ser. No. 346,711, supra, showed unequivocally that steps 3, 4, and 5, supra, can be completely eliminated when coating urea with sulfur if the operation is done within the limits we specify and using the equipment of our design. Step 1 can also be eliminated if the urea can be obtained for feed to the coating operation in a smooth, round, granular form at a temperature commensurate with that required by our sulfur-coating process. These conditions might exist where the urea granulation facilities and the sulfur-coating facilities are located in close proximity to one another. However, in most cases, as in ours at the present time, the substrate granules will need to receive the pretreatment step to prepare their surface properly to receive the sulfur coating.

It has long been recognized that fertilizer granules or other particulate materials with rough surfaces or protruding crystals have been extremely difficult to completely cover with coating materials without using excessive quantities of the coating material.

In our earliest work we discovered new and relatively sample means and procedures whereby the surface of the fusible fertilizer granules or other particulate materials, and in particular, urea can be effectively improved, while at the same time heating the material to the temperature level required by our sulfur-coating process. This is accomplished by preheating and rolling the substrate material in a rotary drum to smooth out irregularities in the surface of the granules, thus greatly enhancing their ability to receive a good coating. The equipment we use consists of an insulated rotary drum that is smooth inside without flights but having enough friction to prevent slippage of the bed. The heat energy in our installation is introduced through the use of electrical resistance heating rods which run parallel to the drum and extend to within 3 inches of the end of the drum. Our rods are located 2 inches apart on centerline and in a plane parallel to and approximately 6 inches from the bed of material being heated. About 33 percent of the heat output of the rods radiates directly to the bed. The remainder radiates to the inside surface of the preheating drum and subsequently is transferred to the particles by conduction on contact of the surface of the drum and the particles rolling in it. We found in our earliest work that operating this 2-foot-diameter by 6½-foot-long drum at 35 to 45 percent of critical speed afforded the best conditions for preheating and smoothing the surface of the substrate materials. The critical speed of a horizontal drum is defined as the speed at which free-flowing material inside the drum could just be carried completely around the drum by centrifugal action; critical speed $$(RPM) = \frac{76.5}{\sqrt{D}},$$

where D represents the diameter of the drum in feet.

FIG. 1 shows a cross-sectional view of our rotary heating drum, which is called the preheater drum. FIG. 1, which is introduced more formally infra, is referred to more specifically at this time to facilitate understanding of this particular aspect of the instant invention.

The granules to be preheated are fed continuously into one end of the preheater. As the preheater drum revolves, the granules form a bed as depicted in FIG. 1. With the revolving of the drum, the particles being preheated also revolve as shown by the arrows. The particles can be in contact with the drum only along the arc from A to B. During this time, there is no movement of particles with respect to each other or with respect to the drum. When the particles reach point B, they cascade across the face of the bed toward point A. While cascading, the particles move both in respect to each other and with respect to the drum. While the particles are cascading under the heating rods, they are continually revolving so that they are receiving heat evenly on their surfaces and at the same time are transmitting heat to the particles under them. Further, the particles are continually shifting orientation among themselves so that a given particle may submerge in the bed as it is cascading toward point A. The surfaces of the particles do not reach their fusion point under these heating conditions. However, when the particles come in contact with the inside surface of the preheater shell at point A, they do not move until completing the approximate one-third revolution to point B. During this time they are in contact with the shell of the drum which is above the fusion point of the material. At the point of contact between the granule and the drum, the granule receives an intense transfer of heat. The result is superficial melting of the granule at the point of contact. After the granule reaches point B, it releases from the shell and cascades down the face of the bed where the slightly melted and softened portion of the granules are polished by contact with other granules into a smooth rounded surface.

If too much heat is allowed to pass from the drum shell to a given particle, it will melt excessively at its point of contact with the drum. As the amount of melting increases, the molecular adhesion forces between the liquid and the drum shell increase. Too much melting can increase the adhesion force between the particle and the drum shell to the point where sticking and subsequent buildup on the walls of the drum occur. With only slight superficial melting, the molecular adhesion forces are not strong enough to support the weight of the granule.

Unless a granule sticks to the drum shell, the longest time which it is ever in contact with the drum is the time it takes the drum to revolve from point A to point B; this is defined for further reference as the uninterrupted contact time (U.C.T.) of a granule and the shell of the drum.

It can easily be seen that for surface melting to be accomplished on a granule, the inside surface of the shell of the drum which comes in contact with the granule must be above the melting point of the granule. Further, it is known from simple thermodynamics that the heat-transfer rate varies directly with the temperature difference between two contacting bodies. Therefore, for a given uninterrupted contact time (U.C.T.), if the heat-transfer rate is increased by increasing the preheater shell temperature, more heat will be passed to the granule and if the shell temperature is above the melting point of the granule, then the surface melting on the granule will increase. Our operational experience shows that the best polishing action on the granules occurs where the amount of surface melting on the granules is approaching the point where the molecular adhesion force of the liquid will cause sticking of the granules to the drum.

Since the heat transferred per uninterrupted contact effectively determines the degree of melting which occurs on a granule with a low thermal conductivity such as urea, provided the shell temperature is above the melting point of the granule, then the operation of our preheater can be represented by the equation:

$$q = Q(U.C.T.)$$

where $q$ is the heat transferred per unit of shell area from the preheater to granules in contact with it per contact; $Q$ is the heat-transfer rate between the drum and granules in contact with it; and $(U.C.T.)$ is the uninterrupted contact time of the granules with the preheater. For any given material, size range of granules, and specified inlet and outlet temperature, $q$ is a constant. The heat-transfer rate then varies inversely with the (U.C.T.). The (U.C.T.) depends on (1) the preheater diameter, (2) the rotational speed of the drum, and (3) the percent loading the drum (the percent of the total volume of the drum occupied by the bed of granules). It can be fully represented by the equation:

$$(U.C.T.) = \frac{60 \cos^{-1} \frac{r-h}{r}}{\pi R}$$

where U.C.T. is the uninterrupted contact time in seconds, R is the revolutions per minute of the preheater drum, r is the radius of the preheater drum, and h is the depth of the bed of granules.

Our more recent work, i.e., Ser. No. 346,711, supra, has shown us that for urea granules in the size range of minus 6 plus 10 Tyler standard sieve size $q$ should be controlled between 0.10 and 0.28 Btu per square foot per contact when smoothing or preheating granules according to our process, and that the critical speed of the drum should be between 15 and 75 percent. The present loading of the preheater should be maintained between 5 and 40 percent. With a decrease in urea size to minus 8 plus 12 Tyler standard sieve size, our work has shown that $q$ should be controlled between 0.075 and 0.21 Btu per square foot per contact. In all cases the drum diameter must be sized to ensure shell temperatures of over 275°F, the melting point of urea. It will be obvious to those skilled in the art of heat transfer that when heating granules larger than those mentioned, $q$ should be increased and when heating smaller granules, it must be decreased.

In our process the electric resistance heaters provided a convenient and efficient source of radiant heat, but it should be understood that other type of radiant heaters or other means of heating the shell of the preheater drum could be used within the scope of our invention.

In our earliest work, we developed and demonstrated unique equipment and procedures for coating fertilizer granules or other particulate materials more effectively and efficiently than has been practical with known prior-art procedures. In our procedure, the substrate particles from the previous preheating and smoothing step are tumbled rapidly beneath sprays of the coating material under closely controlled operating conditions until the desired degree of coating has been attained. This procedure coats the particles with multiple thin layers of the coating material instead of fewer but thicker layers common to products made by prior-art procedures. Coatings of molten materials such as sulfur usually develop cracks or fissures as they solidify, and the coated particles require additional sealant to make them impervious to moisture. However, we have discovered a process which applies the sulfur so that it has an elastic structure which resists such cracking. Further, we have developed the unique equipment and the spraying procedures necessary to apply the sulfur so that essentially a uniform sulfur coverage of all surfaces is obtained while applying the sulfur in the elastic form. This has eliminated the need for sealants, precoats, microbicides, plasticizers, and parting agents.

Our process is based on the use of a horizontal rotary drum for coating fertilizer granules or other particulate materials and, in particular, urea granules. The drum used in our previous experimental work has a smooth surface inside without flights, is insulated outside, and is equipped with a variable-speed drive to regulate the speed of the drum. A thin layer of the coating material adhering to the inside of the drum provides sufficient friction to give good bed action and prevent slippage (rocking) of the bed.

A steam-jacketed spray header for distributing the coating medium is mounted inside the drum approximately parallel to the axis of the drum. The design and operation of the spray header, along with the sprays and associated feed system, are unique and constitute one of the key features of our process. The spray header is adjustable so that the sprays can be correctly positioned above the cascading bed of substrate material. Spray nozzles are installed at predetermined positions along the header for uniformly distributing the coating medium onto the bed of substrate material.

When trying to apply a thin coating of sulfur onto the substrate material by our process, it is mandatory that the sulfur be highly atomized and applied in a uniform manner. This degree of atomization previously has been obtained only by the use of nozzles which use air as their atomizing force.

FIG. 2 shows a cross section of an air-atomizing nozzle and gives the details of the unique sulfur spray header we have developed to make the use of a multiplicity of these nozzles feasible.

FIG. 2, which is introduced more formally infra, is referred to more specifically at this time to facilitate understanding of this particular aspect of the instant invention.

Referring to FIG. 2, it can be appreciated that in air-atomizing nozzles, air which passes through the annular space surrounding the liquid nozzle acts as the force to atomize the liquid as it expands on leaving the nozzle. The air also has some aspirating capacity which supplies the force to feed the liquid to the tip for spraying when operating at low liquid flows. The liquid nozzle tip is so large in relation to the liquid flow that there is very little pressure drop across it and very little force is needed to supply the liquid to the tip. If the liquid were to be ejected from the tip by hydraulic force, the air would not be able to atomize it properly.

The air to the wing tips of the nozzle serves only to shape the spray pattern of the atomized liquid and has very little atomizing or aspirating effect on the liquid being sprayed.

In our process, as reported in Ser. No. 346,711 supra, if the sulfur flow rate to an air-atomizing nozzle is increased, the degree of atomization of the sulfur is decreased. Even when larger nozzles designed to handle more sulfur are used, the atomization of the sulfur is less. Further, the spray density increases with increases in sulfur rate per nozzle without regard to the nozzle size. For our process, an increase in spray distance must accompany an increase in spray density in order to maintain the same spray density at the coating surface and thus the best coating conditions. Increasing the spray distance beyond about 8 inches from the bed is both impractical and extremely hazardous as sulfur explosions may occur. Therefore, a multiplicity of spray nozzles had to be used for a plant such as ours which had a ½-ton per hour capacity (Ser. No. 346,711 supra) for making a slow-release urea coated only with sulfur. Because there is essentially no pressure drop across the nozzle tips, we have found when sulfur is fed at a controlled rate to a header containing a multiplicity of air-atomizing nozzles, some nozzles will spray large amounts of sulfur poorly atomized, some will spray a small amount highly atomized, and some with spray nothing. Further, we found that some nozzles will plug with carsul, a reduction product of commercial sulfur and the hydrocarbons it contains as impurities. Particles of carsul are soft and would flow through the nozzle tip under pressure, but since there is essentially no pressure drop across the nozzle tip, the slight restriction of the tip retains them, rendering the nozzle useless for further sulfur application.

We developed, in Ser. No. 346,711 supra, a sulfur header which ensures equal flow to all air-atomizing nozzles and prevents pluggage because of carsul. Without this header or a complicated and extremely expensive sulfur control system, our sulfur-coating process would not be feasible on a large scale. We obtain equal sulfur flows to each nozzle within plus or minus 6 percent and have eliminated nozzle pluggages because of carsul. FIG. 2 shows how we install a small fixed orifice, 0.018 to 0.028 inch in diameter depending on the desired sulfur flow rate in the sulfur line immediately before each spray nozzle. The orifices are sized to maintain considerable back pressure in the header. They are almost the total source of pressure drop in the sulfur header and nozzle system. If they are all the same size, an equal flow rate of sulfur to each nozzle can be obtained. If a nozzle starts to plug with carsul, the back pressure normally maintained on the orifice is transmitted hydraulically through the orifice and directed on the nozzle tip where it extrudes the carsul through the tip. The orifices themselves do not plug as the same force which extrudes the carsul through the nozzle tips extrudes the carsul through them. In-line filtering of the sulfur is still required upstream of the orifices to remove solid impurities from the sulfur larger than the orifice opening. The carsul, however, can never be filtered completely out as it can form downstream of the filter, even in the nozzle itself. Therefore, the pressure to extrude it through the nozzle must be available. It can be seen that by using orifices of various sizes, the sulfur flow through each nozzle can be proportioned. However, equal flows appear to be best in our process. It can readily be seen that when using a multiplicity of nozzles which have a sizeable pressure drop across their nozzle tip, a system such as ours is not needed to regulate equal liquid flows. Fortunately, and contrary to our earlier convictions, i.e., Ser. No. 346,711, supra, we have been able to develop such an alternate system. We have now discovered the right combination of process conditions that, when used with extremely high-pressure hydraulically atomizing nozzles, makes it possible and practical to make a slow-release fertilizer using only a sulfur coating. The atomization of the sulfur which is so mandatory in our earlier work is still clearly important, but the obvious reduction in atomization to those schooled in the art is compensated by the change in processing conditions. Further discussion of this alternate system is presented infra.

Although operation of the primary coating system is quite simple, best results are obtained if several variables are closely controlled. These variables include rotational speed of coating drum, position of the spray header in respect to the bed of substrate material (laterally and vertically), temperature of the substrate material, and temperature of the coating material. Experience has shown that the actual conditions may differ for each size and type of coated product.

The pattern and speed of the substrate material passing beneath the sprays of coating material for a given drum are affected by (1) the rotational speed of the drum, (2) roughness of the interior of the drum, (3) the size uniformity of the substrate material, (4) substrate throughput rate, (5) position of the spray nozzles, and (6) bed depth. The drum speed is the primary control for regulating the bed condition since the substrate size and uniformity, as well as the interior surface condition of the drum, usually remain reasonably constant for a given period of operation. We have observed that different drum speeds are required for different production rates and for different size and size distribution of the substrate material. In our experience with sulfur coating of urea, we have found that drum speeds of about 50 to 70 percent of critical speed gave the best results.

The position at which the spray header is placed depends largely upon the type and proportion of coating being applied. For production of products, in particular, urea, in which it is desired to uniformly coat all size fractions of the substrate material with a material such as molten sulfur, the spray header is positioned above the area where the cascading smaller size fraction blends with the larger particles in the bed. The optimum distance between the spray header and bed of material will depend upon the size and spray pattern characteristics of the spray nozzles, amount of material being sprayed from each nozzle, and the physical characteristics of the coating material.

Good control of operating temperatures is essential for production of high-quality coated products. The coating material should be sprayed at a temperature that will provide adequate fluidity for easy dispersion and at several degrees above the solidification point of the solution, slurry, or melt. The temperature of the product in the coating drum should be maintained several degrees below the solidification temperature of the coating material; if the temperature is too low, the coating material will solidify too rapidly and form a rough nonuniform (seedy appearance) surface. Coating the product at too high a temperature may cause the particles to stick together and form agglomerates, and in the case of sulfur coating, adversely affect crystal structure of the coating. The coating will be damaged when the agglomerates are separated during subsequent handling. The temperature of the product in the coating drum is a function of (1) temperature of the substrate material fed to the coating drum, (2) temperature of coating material, (3) proportion of coating material used, (4) heat losses from the coating drum, and (5) production rate. During stable operation, the temperature of the material in the coating drum is regulated by varying the temperature of the substrate material fed to the drum. Of course, the actual temperatures required will depend upon the compositions of the substrate and coating materials and the end use of the coated product.

In our earliest work with sulfur coating of urea to provide a product with controlled nutrient release characteristics, we obtained the best results with the following range of conditions:

Temperature of substrate material fed to coating drum, 130°–210°F.
Temperature of sulfur at sprays, 275°–315°F.
Temperature of coated product discharged from coating drum, 140°–210°F.

In our earliest work, seal coating was used following the sulfur coating in many cases. When this was done, the product from the coating drum was ready for storage and use after it had been cooled to near ambient temperature. However, cooling did not appear to be required for sulfur-coated urea made without a seal coat at 200°F.

We discovered in our earliest work that when making urea coated only with sulfur, rapid cooling of the sulfur-coated urea provided a product with a smoother, more impervious surface than could be obtained by allowing the product to cool slowly. It was observed that dissolution rates were much higher for samples of sulfur-coated product that were allowed to cool slowly than for similar samples of product that were cooled rapidly when the initial temperature was above 202°F. Microscopic examinations revealed that the sulfur on the surface of the slowly cooled granules was in the form of large orthorhombic-type crystals and contained very little of the amorphous form. At the crystal interface, or the boundary between the crystal formations, visible cracks developed in the coating. This accounted for the high dissolution rates obtained from products allowed to cool slowly. Examination of the product that had been rapidly cooled revealed that the coating contained minute crystals cemented with amorphous sulfur and fissures were very small. The coated particles had an overall smooth appearance, and the dissolution rate probably was dependent on coating thickness and/or coating imperfections resulting from the actual coating operation. A fluidized bed cooler was very effective for rapid cooling of the granules at the required rates of production.

The results stated and discussed above are based on our earliest work which was fully reported in our application Ser. No. 268,520, supra. Subsequent work on this process has provided further substantiation of our earliest discoveries and has also resulted in additional discoveries.

Our more recent work, i.e. Ser. No. 346,711 supra. shows that we have indeed invented a unique slow-release fertilizer and discovered an extremely simple process for producing this material. In prior-art methods and processes, the slow-release fertilizers produced which employed sulfur as the basic coating material also required at least one additional coating and more generally two or three additional coatings and a sulfur additive. Blouin et al. (U.S. Pat. Nos. 3,295,950 and 3,342,577) teach the use of either a subcoating of an organic hydrophobic compound followed by the primary coating of sulfur, the primary coating of sulfur followed by a seal coating of a hydrophobic compound, or a combination of all three coatings. Then sometimes a plasticizer was added to the sulfur and/or a microbially toxic agent was added to the wax. In a paper (Blouin, G. M., Rindt, D. W., Moore, O. E., *Agricultural and Food Chemistry*, Vol. 19, No. 5, page 801, September/October 1971) published since the issuance of the patents, Blouin states that an additional coating of conditioner is required on the final product to soak up unsolidified oils and give the product free-flowing characteristics. This is indeed part of the basic TVA process described in our parent application, Ser. No. 268,520 supra. Also, Fleming (U.S. Pat. No. 3,576,613) described a process which always includes a precoat of fine powder plus a coating of sulfur. In most of his examples, a seal coat of a hydrophobic compound was added. He also indicates he made compounds with the addition of a sulfur plasticizer.

We can find no published information that anyone has ever been successful prior to our efforts in producing a slow-release fertilizer coated with sulfur only. Our success in producing a slow-release fertilizer using only sulfur is a result of being able to apply the sulfur to the fertilizer in a manner which maximizes the elasticity of the sulfur coating.

Numerous textbooks and patents have been presented about the very complex structural chemistry of sulfur; however, still a lot remains unknown. Sulfur is known to have two basic crystalline forms, orthorhombic and monoclinic. It is further generally known that the orthorhombic crystalline structure is stable below 203.9°F and the monoclinic structure is stable above it. Neither the rhombic nor the monoclinic crystalline forms of sulfur have much tensile strength. We know that a coating of sulfur which has a high tensile strength will prevent cracking and splitting of the coating caused by internal stress during manufacturing and storage of the fertilizer and will reduce fracturing of the coating caused by rough handling of the granules. Blouin and Fleming both recognized the value of a coating with plasticity. However, neither presents evidence that they were successful enough, even using plasticizers, that they could eliminate both the subcoat and seal coat from their product.

We have been very successful in our efforts to provide plasticity and thus tensile strength to the sulfur coating. It has been done by controlling the process conditions which stimulate polymerization of sulfur and all our success has been achieved without the use of any type of additive to the sulfur.

Dale et al.[1] show the effect that a small percentage of polymerized sulfur can have on the tensile strength of cast sulfur test specimens. They show evidence that the presence of a small percentage of sulfur $\mu$, an amorphous catenapolysulfur, in a mixture with orthorhombic sulfur will provide the necessary polymer to give a tensile strength 10 times that of pure orthorhombic sulfur. Dale et al. further present evidence that sulfur $\mu$ is fairly stable in a mixture with orthorhombic suflur, but not at all stable in a mixture with monoclinic sulfur. We have incorporated this information in our work. However, we have made several unique and important discoveries that are essential in the application of a thin coating containing a mixture of orthorhombic and amorphous sulfur. They are contrary to the classic teachings in the production of an amorphous sulfur, which say that the sulfur should be heated to above 318°F to form a large percentage of sulfur $\mu$ in the liquid phase and quench-cooled to below minus 20°F to solidify it into a stable amorphous structure. We have found that to produce the best sulfur coating that the sulfur should not be sprayed above the temperature of 318°F. In our more recent work, i.e., Ser. No. 346,711 supra, we have discovered that the best results were obtained when the temperature of the sulfur being sprayed was 300° to 318°F. Molten sulfur below 300°F was not extensively tested but should be acceptable for use. We have some evidence that heating the sulfur above 318°F and then cooling it below 318°F before spraying is of some value. Extreme atomization of the sulfur particles and uniform application of the sulfur to the granules, as accomplished by the spray header of our invention, are of the utmost importance. Since there is no subcoat or seal coat of wax, oil, coal dust, carbon black, etc., to help the sulfur form a moisture barrier, an evenly applied sulfur coating is imperative. In order to obtain an extremely uniform sulfur coating, the coating application time must be increased over that used for the conventional sulfur-coating process where sealants or subcoats are used. In our work we found that the quality of the coating appeared best when the sulfur drum retention time was 11 minutes or approximately twice that of the conventional sulfur-coating process. The temperature of the urea being coated should not exceed at any time the temperature of transition (203.9°F) between orthorhombic and monoclinic sulfur, but completely contrary to normal teaching for the maximization of sulfur $\mu$ the sulfur should be applied to a surface having a temperature as near as possible to 203.9°F, but not exceeding it. We have found that by extreme atomization the sulfur particles are so small that they take on the temperature of the urea surface immediately upon contact. Thus, most of the sulfur crystallizes directly onto the orthorhombic structure where the portion of sulfur which solidifies as sulfur $\mu$ is stable. If the temperature of the surface is allowed to exceed 203.9°F, the structure of the crystallized sulfur wll be monoclinic, and the sulfur $\mu$ that solidifies and is responsible for the tensile strength of the coating will quickly change to the monoclinic structure and the coating of sulfur will be useless without a seal coating. We have discovered that as the temperature of the bed of urea being coated decreases, the percentage of sulfur $\mu$ which is in the coating decreases and the quality of the product decreases as measured by laboratory analysis which determines the amount of urea which dissolves in 250 milliliters of $H_2O$ from a 50-gram sample when the sample is held at 100°F for 7 days. If at any time the temperature of the surface of the urea being coated is allowed to exceed 203.9°F, quick cooling of the product to around 100°F minimizes the adverse effects on the product. We have found that reducing the temperature of the product in this case just below the temperature of 203.9°F is not sufficient, and that adverse effects on the product will continue being proportional to the temperature of the product and the length of time it persists. The damage done to the sulfur coating can be minimized by cooling to a relatively low temperature after the coating operation. The amount of damage is decreased with an increased degree of cooling. If the temperature of the surface on which the sulfur is sprayed never exceeds 203.9°F, we have found no evidence which indicates quick-cooling is necessary.

[1] Dale, J. M., Ludwig, A. C., "Elemental Sulfur," Beat Meyers, Ed., Interscience Publishers, New York, New York, 1965, Chapter 8.

In our more recent work, i.e. Ser. No. 346,711 supra, we have used a Scanning Electron Microscope (SEM) to examine the surface and cross sections of sulfur coatings which were applied under various conditions. Magnifications up to 5000 show that when the sulfur is applied to a surface which has a temperature just under 203.9°F, the texture of the resulting coating is mosaic having an interstitial dispersion of sulfur within a granular matrix of orthorhombic sulfur. We have numerous scanning electron photomicrographs which reveal beyond question to anyone skilled in the art of electron scanning microscope that this interstitial dispersion is an amorphous elastomer. Further, chemical laboratory analyses have shown that up to 5.1 percent of the sulfur present in the coating is sulfur $\mu$. Therefore, the interstitial dispersion is considered to be sulfur $\mu$. When sulfur is applied to a surface having a temperature higher than 203.9°F without quick cooling, the resulting coating appears to be all orthorhombic sulfur with a massive texture. If the coating temperature is slightly higher than 203.9°F, some of the mosaic texture is preserved by severe quick cooling. As surface application temperatures decrease from 203.9°F, the amount of the interstitial phase of the mosaic texture decreases along with percentage of sulfur $\mu$. Urea which is sulfur coated when its surface temperatures range from 145° to 170°F has a sulfur coating with a massive texture consisting almost entirely of orthorhombic crystals. SEM observation shows that this coating cracks. This is why granules coated at the lower temperatures, supra, must always have a subcoat and/or a seal coat such is applied by Blouin and Fleming, as no reasonable amount of sulfur applied to the surface of the fertilizer at these temperatures can prevent immediate dissolution of the fertilizer, whereas a sulfur coating applied at the higher temperatures, supra, can be entirely sufficient to produce a slow-release fertilizer. However, using the correct coating temperature is only part of the process of making a sulfur-only product. The application of sulfur in the manner allowed by our sulfur spray header is imperative if success is to be attained. Also, the urea granules must have a smooth, round surface such as provided by our preheater.

The merits of our sulfur-only process can quickly be seen by those familiar with fertilizer production and the operating and construction costs involved. Approximately one-half of the processing equipment and the manpower now associated with making conventional sulfur-coated fertilizers can be eliminated along with expensive hydrophobic sealants and plasticizers, highly explosive mixtures of carbon and coal dust, and microbially toxic agents which are potential health hazards. Oil-absorbing conditioners which add some expenses and bulk to the product are also eliminated.

Much of our most recent test work, reported in Ser. No. 346,711 supra, in the production of sulfur-only material was made using a drum-granulated feed urea which had received a conditioning coat of Barnet clay kaolinite equal to 1 percent of the product's weight applied by the manufacturer to protect the urea against caking during shipping and storage. Because of the size of our pilot-plant facility which uses up to 2 tons per hour of feed urea, we were unable to secure unconditioned urea in the quantity we needed and prevent it from caking before we used it. It was apparent that we would have to use conditioned urea in most of our preliminary coating work, and we needed to know the effect it would have on the final product. Therefore, we special-ordered some unconditioned urea in heat-sealed, heavy duty, moisture-proof polyethylene bags. Immediately upon arrival, we conditioned half of the material with 1 percent Barnet clay. The unconditioned urea and the conditioned material were fed to the sulfur-coating pilot plant sequentially under the same coating conditions. The results showed that the material with the 1-percent clay conditioner required a coating which averaged 2 percentage points lower in its sulfur requirement in order to produce a product with the same dissolution rate. These data were used in evaluation of our more recent work, i.e., Ser. No. 346,711 supra, with the sulfur-only process with the exception of urea we produced ourselves. On completion of our preliminary tests, we set up a pilot plant to produce pan-granulated urea so that we could take the freshly produced urea without any conditioning coating of any kind to further prove the credibility of our process which uses absolutely nothing but sulfur as a coating for the fertilizer.

Now in our latest work we have used hydraulic pressure atomizing nozzles to produce slow-release fertilizer. Hydraulic nozzles cannot atomize sulfur to the degree that is possible with pneumatic nozzles; therefore, we find some very striking differences between the hydraulic and pneumatic processes and the products of these processes. Some of the producers will prefer to use the new hydraulic process because it is a more simplified process with considerable reduction in original capital expense. However, some of the producers will still prefer the pneumatic atomizing process because it can produce a product with a higher nitrogen content. In the hydraulic atomizing process, we found that the urea does not have to be preheated. However, we will show by example infra that the optimum preheating temperature is between 130° and 160°F—much lower than the 185° to 195°F optimum temperature of the pneumatic process. In the hydraulic process, as in the pneumatic process, preheating by the method of our invention supra not only provides heat to the granule but improves its surface condition by smoothing, rounding, and glazing the urea granule, thus making the surface more susceptible to a uniform and imperfection-free coating of sulfur. This sulfur coating is applied in the sulfur-coating drum of the same design as that used in the pneumatic atomizing process. Sulfur is applied through eight spray nozzles mounted in a steam jacketed header. The spray heater itself is much simpler than that of the pneumatic system. No flow-control orifice is needed since each nozzle at the high pressure involved (300 to 3000 psig) acts as its own flow-control orifice. Note: Although we were limited to a maximum pressure of 3000 psig by the equipment at hand, even higher spray pressure could undoubtedly be utilized. A high pressure union allows the header to be rotated so that the angle of spray with reference to the urea being sprayed can be easily changed. Also, the position of the nozzles with reference to the urea can be obtained as desired by use of externally mounted adjustable hangers. The nozzles are located in the header 7¾ inches apart on centerline. With the sulfur-coating drum described supra, the header is located so each nozzle is spraying vertically downward onto the fastest moving section of the rolling bed from a distance of 5½ inches. Now, with the hydraulic pressure atomization system, the most preferred temperature of the urea discharged from the sulfur coating drum is from 155° to 180°F. Previously using the pneumatic atomizing system, the most preferred temperature for the urea discharged from the sulfur-coating drum was as near as possible to 203.9°F, supra. Now the coating on the product is not in the same sulfur structure as previously taught. In fact, our scanning electron microscopic studies and related laboratory tests have been unable to definitely identify the types of sulfur present in the hydraulically applied sulfur coating. The difference in physical characteristics of the coatings is more fully shown by example later.

We have demonstrated our process, equipment, procedures, and techniques in a pilot plant designed for sulfur coating of soluble fertilizer salts to provide fertilizer materials with controlled-dissolution characteristics. Although our examples and data pertain to production of sulfur-coated urea, those versed in the art will readily understand the adaptability of our process, equipment, and procedures to coating other materials with sulfur or for coating miscellaneous materials with various like, similar, or dissimilar materials of a diverse nature.

Our invention, together with its objectives and advantages, will be better understood from a consideration of the following additional description taken in connection with the accompanying drawings in which.

Figure 5:
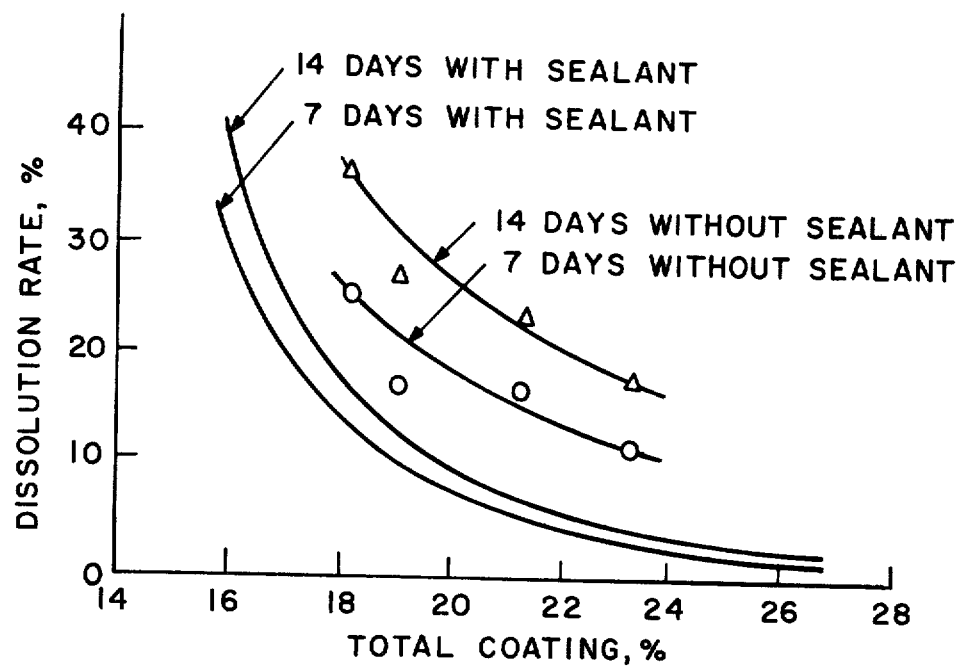

FIG. 5 compares graphically the dissolution rates of sulfur-coated urea without and with a top seal thereover, respectively, and is discussed in Example III infra.

Figure 6:
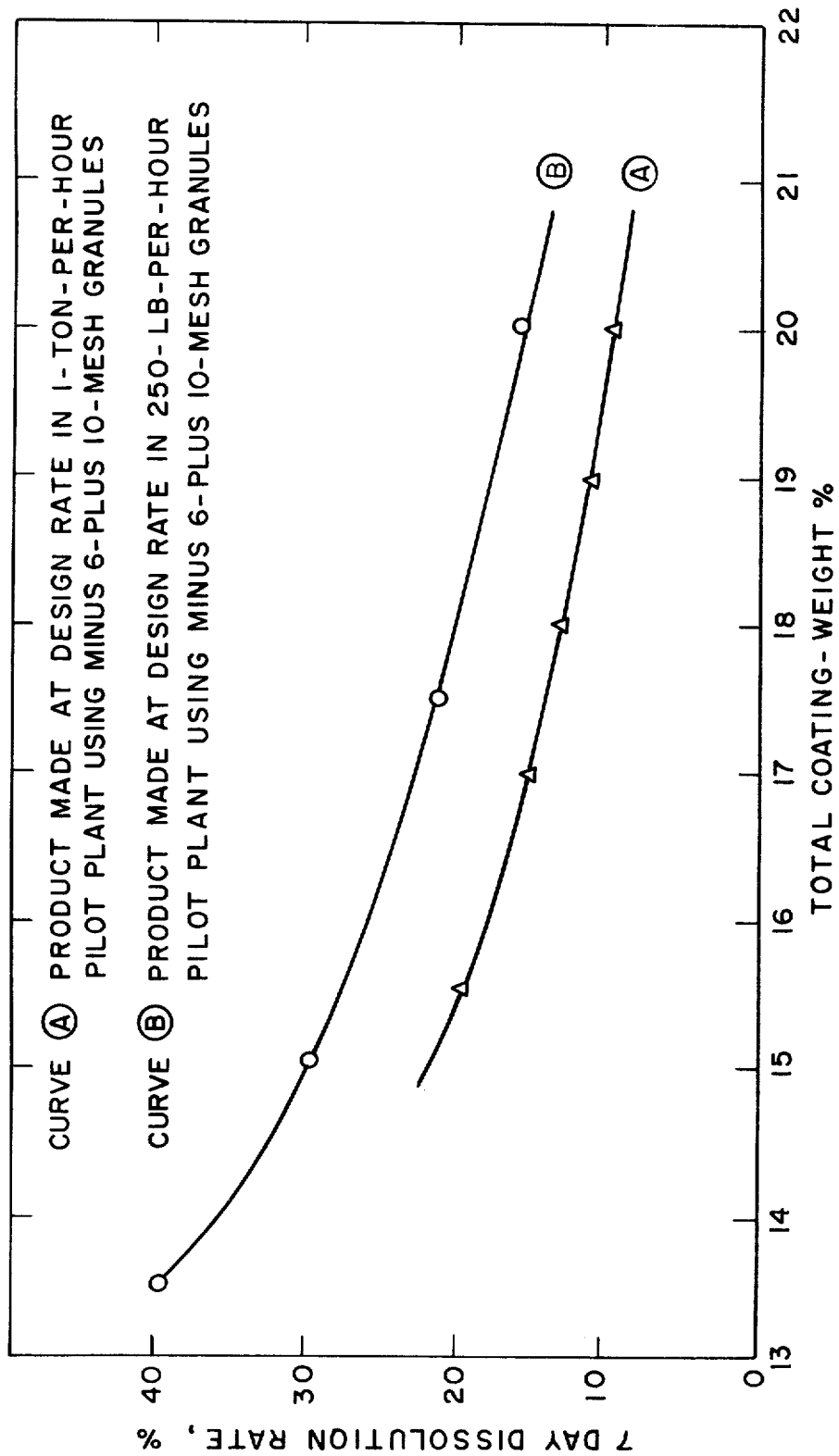

FIG. 6 depicts graphically the relationship between dissolution rates of the substrate and the weight of coating thereover. These data are based on sulfur-coated urea containing a 3-percent wax and 0.25-percent coal tar seal coating overcoated with a 2-percent coating of diatomaceous earth. Its primary purpose is to show the improvements of the large pilot plant over the earlier small one which did not contain the present preheating design or the unique sulfur spray header. Because it does not have this equipment, the small pilot unit has never been able to make slow-release sulfur-coated urea without a subcoat and/or a seal coat and is discussed in Example VI infra.

Figure 7:
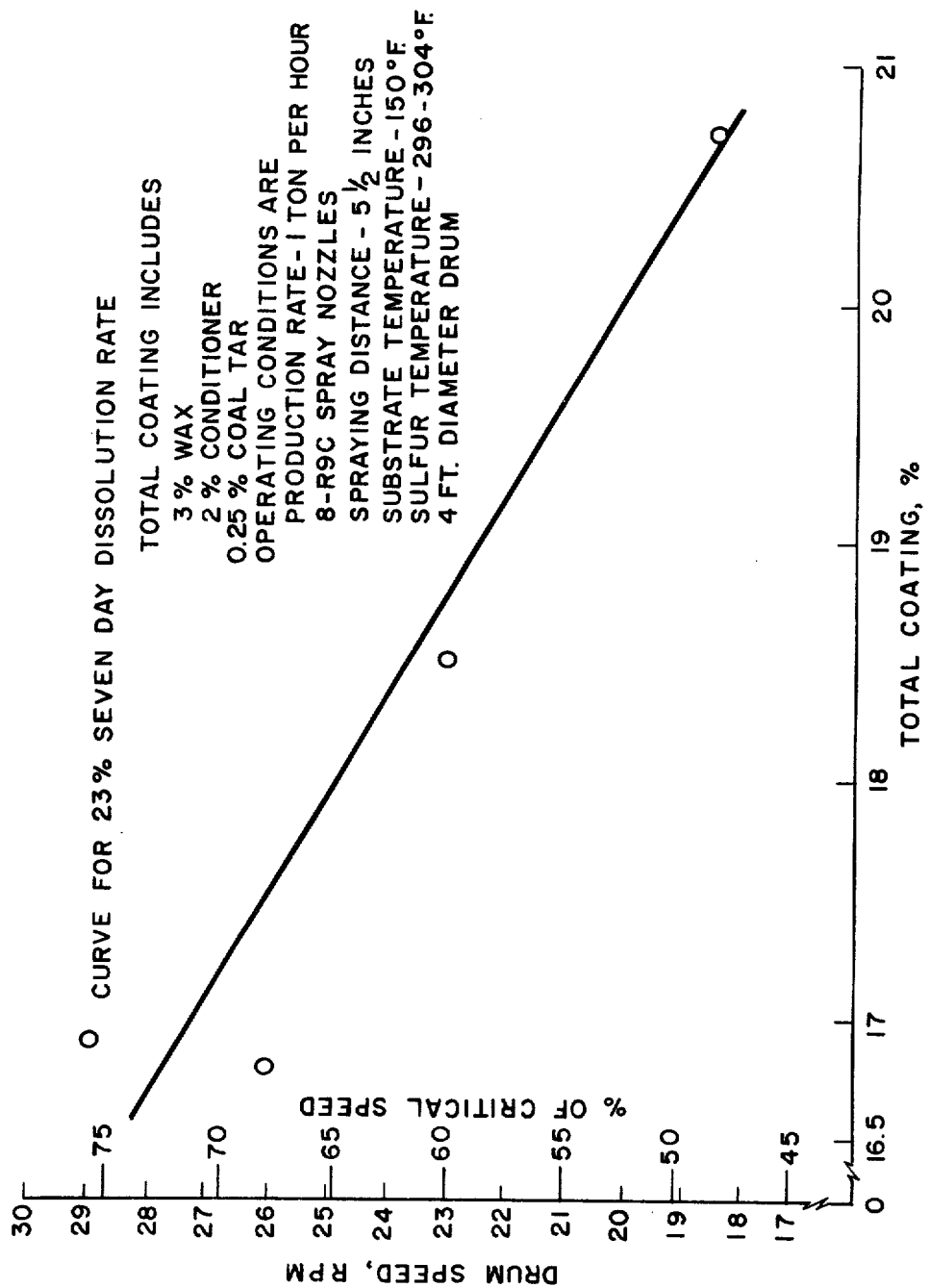

FIG. 7 illustrates graphically the effect of drum speed, i.e., percent of critical speed, on the total coating requirement of the substrate for a given dissolution rate thereof.

Figure 8:
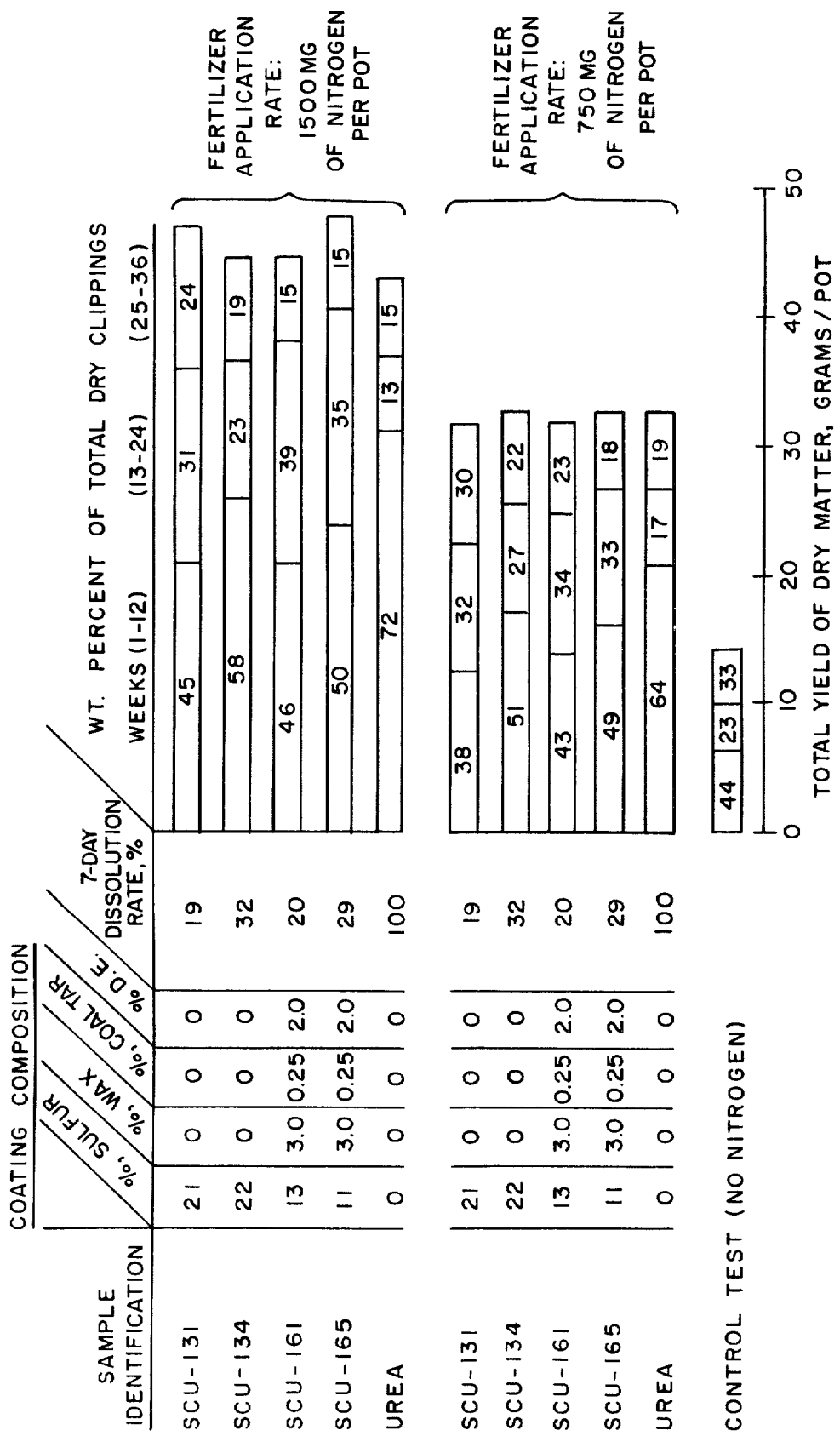

FIG. 8, based on our more recent work, graphically compares the agronomic effect of various sulfur-coated ureas and uncoated urea on the growth of Kentucky 31 fescue grass in a 36-week greenhouse test.

Figure 9:
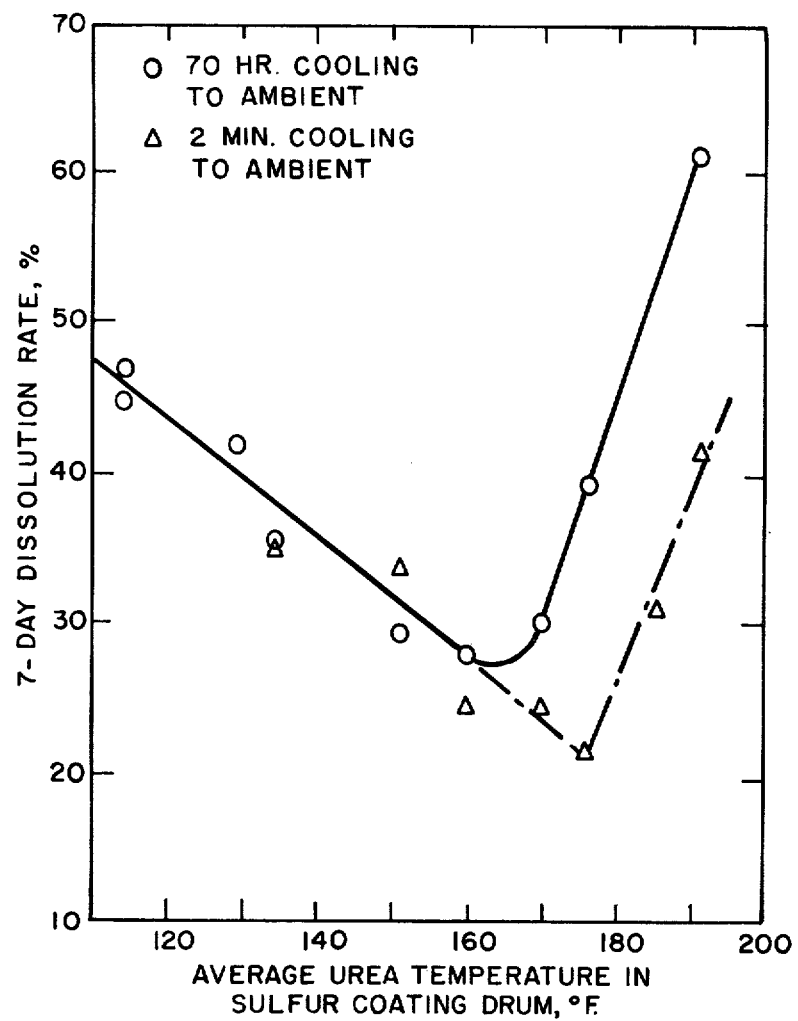

FIG. 9 shows the effects of urea temperature in the sulfur-coating drum on dissolution of sulfur-coated urea with no seal coating when made using hydraulic pressure atomizing nozzles in our most recent work. It is a sequel to FIG. 4, supra, where the sulfur was sprayed with pneumatic atomizing nozzles. Further, when compared with FIG. 4, it vividly demonstrates the difference in the coating conditions needed to make a slow-release fertilizer using the two types of nozzles.

Figure 1:
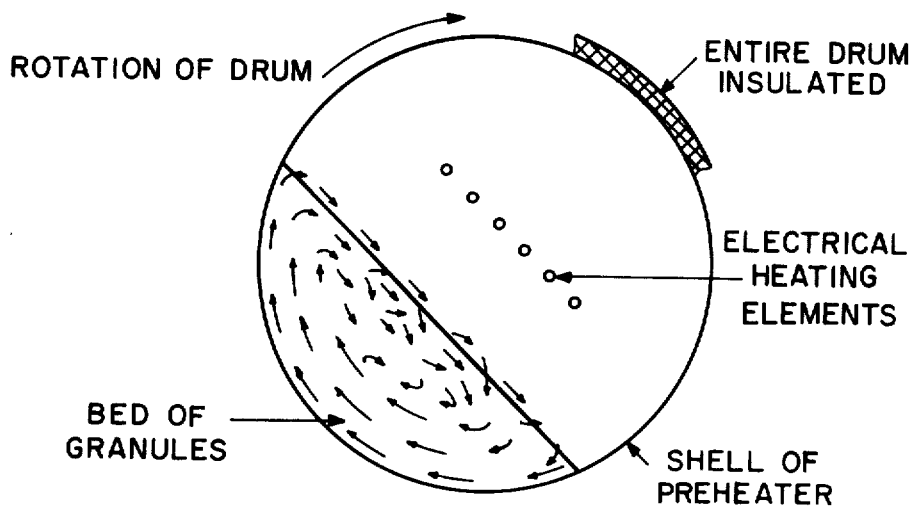
FIG. 1 shows a cross-sectional view of our rotary heating drum, which is called the preheater drum.

FIG. 1 was referred to more specifically supra in our discussion of our earliest work in order to facilitate ease in understanding the instant invention.

Figure 2:
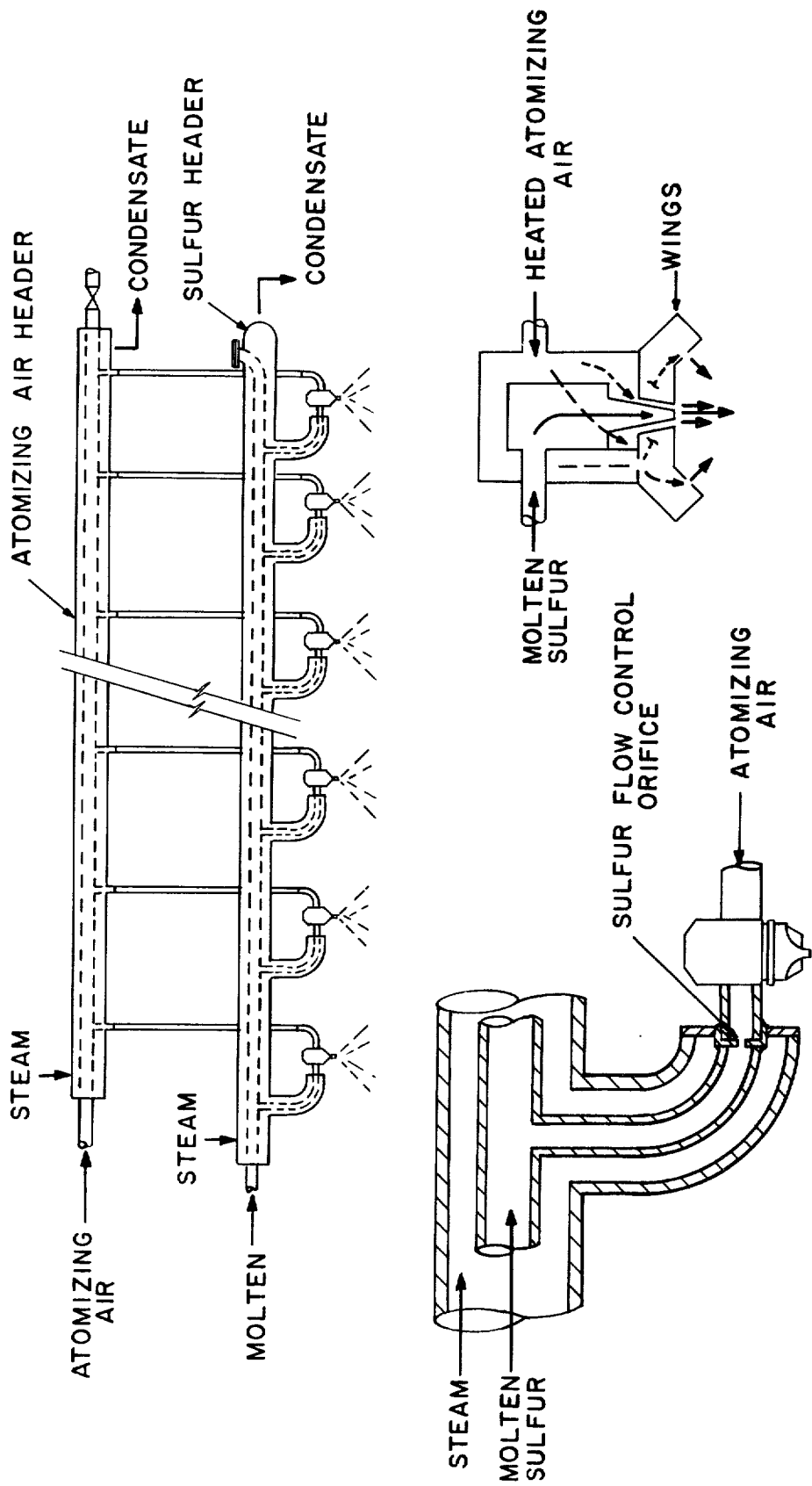
FIG. 2 shows a cross section of an air-atomizing nozzle and gives the details of the unique sulfur spray header we have developed to make the use of a multiplicity of these nozzles feasible.

FIG. 2 was referred to more specifically supra in our discussion of our earliest work in order to facilitate ease in understanding the instant invention.

Figure 3:
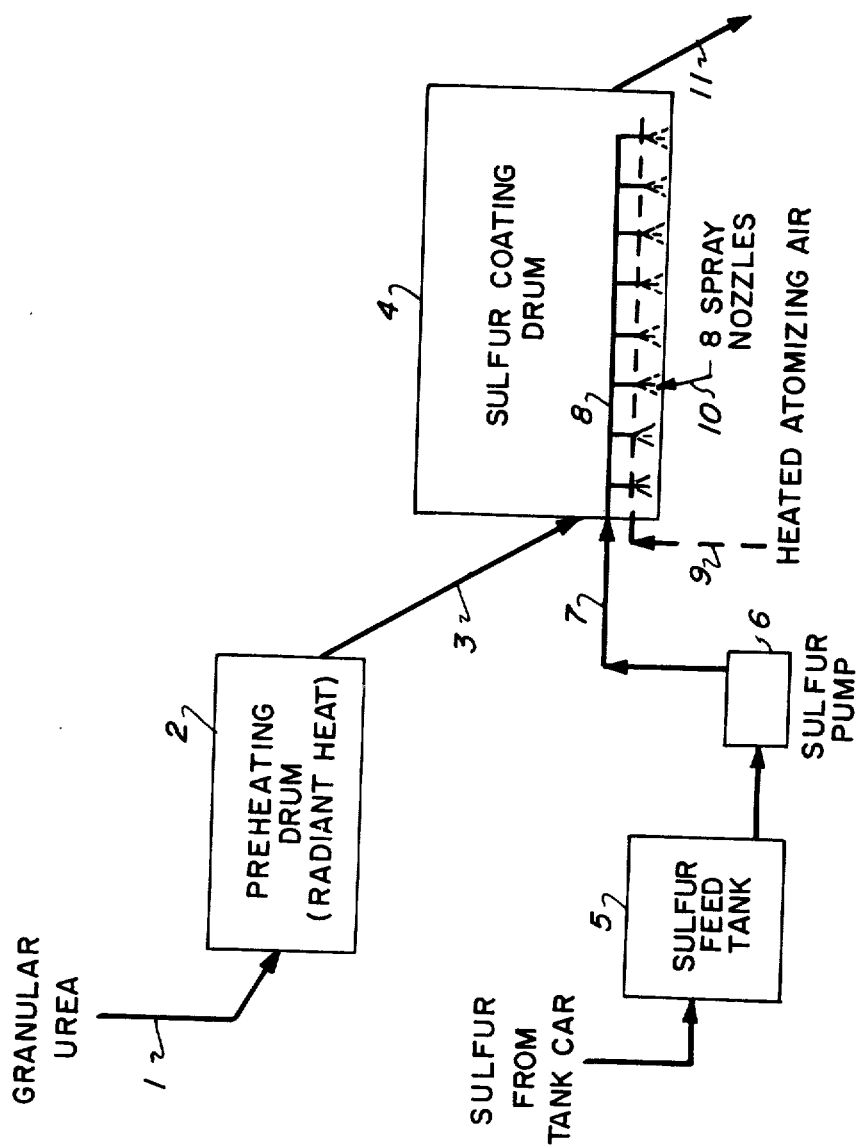
FIG. 3 is a flowsheet in box from generally illustrating the principles of our novel process which results in products having the improved properties mentioned above. In particular it shows application of our process for coating urea with sulfur to control dissolution rates.

Referring now more specifically to FIG. 3, therein is shown our invention as applied specifically to sulfur coating of urea in our more recent work, i.e., Ser. No. 346,711 supra. Urea pellets from a source not shown are fed by means of line 1 into rotary drum 2. Line 1 may comprise a conveyor belt, gravity feed from a hopper, or other similar delivery means equipped with a device for controlling the feed rate. Rotary drum 2 contains a radiant-type heater to preheat the urea and smooth the surface of the particles as they pass through the drum. The preheated pellets are fed by means of line 3 into sulfur-coating drum 4. Line 3 may comprise a chute, conveyor, or any convenient means of transporting the pellets from drum 2 to drum 4. Molten sulfur from tank 5 is pumped with metering pump 6 through steam-jacketed line 7 to sulfur header 8. Heated atomizing air, from a source not shown, passes through line 9 to spray nozzles 10 where it atomizes sulfur supplied from sulfur header 8 through fixed orifices, not shown. The sulfur spray from spray nozzles 10 uniformly coats the cascading bed of urea pellets in rotating coating drum 4. The material is discharged through 11 from the sulfur-coating drum ready for storage.

The basic or fundamental steps of our process are summarized below.

1. Use of heat input in a rotary drum to smooth out irregularities in the substrate particles by a combination of surface melting and tumbling action. This would not be required if the urea was available at the desired processing temperatures and had a smooth surface—for example, if a urea manufacturing unit is operating at the plant site and producing a suitable granular urea for coating with sulfur.

2. Use of a spray header designed to give maximum coating efficiency by proportioning a uniform sulfur rate to each nozzle and by positioning the nozzles in the optimum location in relation to the bed.

3. Use of different processing conditions to allow production of a slow-release fertilizer using only a coating of sulfur without any precoats, subcoats, seal coats, urea additives, or sulfur additives.

Blouin et al., supra, teach that a secondary coating, such as a petroleum wax, is required to seal the cracks or fissures in their sulfur-coated products on which the sulfur is essentially in a crystalline form. Further, they have stated that, "neither wax (up to 15%) nor sulfur (up to 40%) alone formed effective coatings; only sulfur coating sealed with wax film was effective." Our invention with the excellent quality of sulfur coating in essentially noncrystalline form gave products that did not require any secondary coating to seal the sulfur. In practicing our invention with sulfur only, the dissolution rates of our products were as low as obtained by Blouin with a heavy secondary coating of wax, nor did our invention require the use of a subcoat on the urea such as that required by Fleming.

In order that those skilled in the art may better understood how the present invention as it relates to our more recent work, i.e. Ser. No. 346,711 supra, can be practiced, the following examples of processes we have used in the steps of producing hygroscopic fertilizer pellets having a nearly impervious shell or coating, thereby ensuring a fertilizer product having a controlled rate of dissolution in the soil solution, are given by way of illustration and not by way of limitation. Of the following examples, Nos. I through VII reflect our earliest work reported in our parent application, supra. In this earliest work we greatly improved the conventional sulfur-coated urea process where some combination of precoats, sealants, microbicides, parting agents, and plasticizers are used along with the sulfur. We had developed a preheater (Examples I and II) and a sulfur spray header (Examples III, IV, V, and VI) which make possible the production of conventional sulfur-coated urea (with seal coats) with much less sulfur than used by prior continuous pilot plants (Example VI). We had even made some material using only sulfur to coat the urea granules, and it had given good laboratory dissolution rates (Examples III and VII). However, we felt that this approach required additional studies in order to completely establish all of the process variables involved and their limitations when making the sulfur-only material. Further, we did not have data on its characteristics as a slow-release fertilizer in soil application in the field. Our more recent work is reported in our Examples VIII through XIII and shown in FIGS. 4 and 8. Herein we present data which demonstrate our process and its variables and without question show that sulfur-coated urea made by our process and using absolutely only sulfur and urea as raw materials is truly a slow-release nitrogen fertilizer agronomically equal to the best sulfur-coated urea containing seal coatings. Doubling the heat capacity in the preheater allowed us to understand the parameters and their limitations involving this step in the process (Example VIII). In Example XI we used pan granulated urea having no precoat whatsoever and coated it only with sulfur to produce a good slow-release nitrogen fertilizer. Examples X and XI and FIG. 3 show some of the temperature limitations of the process. Examples XII, XIII, and FIG. 8 damonstrate the agronomic usefulness of the material as a slow-release nitrogen source.

In our earliest work we showed that a slow-release nitrogen fertilizer could be made efficiently and simply by the application of a coating consisting entirely of sulfur on urea particles. Pneumatic atomizing nozzles were used to obtain the necessary atomization to produce the product under the processing conditions which were required. Unfortunately, there are several problems associated with pneumatic nozzles. These are not insurmountable problems but are of sufficient magnitude to make the development of other methods of sulfur application attractive.

1. Pneumatic nozzles produce a large amount of sulfur mist and dust. The atomizing gas breaks up the sulfur into particles, some of which are even in the submicron size range. This size particle is ideal for sulfur coating. However, when sulfur flow rates varied from 8.2 to 85.5 pounds per hour per nozzle, as reported in table I, i.i., our earlier work, the actual measured sulfur coating yield in our examples [weight of sulfur applied divided by the weight of sulfur sprayed) × 100] varied from 77.0 to 96.0 percent, with six out of the eight examples having yields of 90 percent or less. Most of this yield loss resulted directly from what is commonly called "overspray" by the spraying industry. This is the carrying and atomizing gas bouncing off the spray target and carrying some of the atomized material back with it away from the intended target which is the urea. Most of this sulfur dust and/or mist then had to be collected in the drum ventilation system to prevent a sizeable air pollution problem. Some of the dust plated out on the inside of the sulfur-coating drum and other equipment causing sulfur buildups and their associated operating problems.

2. If sulfur dust levels are allowed to exceed 35 grams per cubic meter in air, the mixture is explosive. Adequate ventilation in the sulfur-coating drum to prevent this was substantial, about 400 cfm for the production rate of 1 ton per hour when making sulfur coated urea without sealant. Other alternatives to prevent the safety problem, such as using inert gas or a mixture of air and inert gas, are quite expensive.

3. A high-pressure gas and associated heating system had to be provided at substantial cost.

4. The sulfur header was very operational, but maintenance accessibility on it appeared to present a problem because of the associated gas piping.

All of these problems have been solved by our latest work. In our latest work, hydraulic spray nozzles operating in the range from 300 to 3000 psig were used to atomize the sulfur. As discussed previously, many variables affect the correct application of sulfur to the urea granules. Our recent discovery shows what would appear to be an interrelationship between sulfur particle size and application temperatures as they affect sulfur crystalline structure on the coated urea. We understand from experts in the spray field that our present hydraulic atomization provides particles which are in order of magnitude larger than those produced previously with our pneumatic atomization. Because they are larger, they do not give granules as uniform a coverage as the pneumatic spray process with similar physical orientation. Therefore, some additional sulfur has to be applied to the urea granules. Normally this is from 2 to 3 percentage points more of sulfur to obtain the same 7-day dissolution rate. Because the hydraulically produced sulfur spray particles are much larger than the pneumatically produced particles, by simple thermodynamics it can be shown that the hydraulically produced sulfur particles cool slower when in contact with a surface having a given temperature. Because of this, we have found that in order to maximize the production of the right sulfur structure in the solidified sulfur coating, which is as close to that obtained with pneumatic nozzles as possible, supra, the coating temperatures of everything but the sulfur must be significantly lower. This is certainly an improvement in the process for less preheating is required thus reducing the process energy requirements and the size of preheating equipment. Because the particles are larger and no atomizing gas is present, dusting has been reduced up to 98 percent, explosive mixtures of sulfur dust and the atmosphere in the sulfur-coating drum can easily be prevented by only a small draft of air through the drum, and sulfur spray efficiency is now measured at approximately 100 percent, even with sulfur flow rates of 50 pounds per hour per nozzle. The sulfur spray header has been simplified so that maintenance should be much easier. This, our most recent work, is reported in our Examples XIV through XVII infra and shown in FIG. 9. Herein we present data which demonstrate our new process and its variables and show conclusively how a sulfur-coated urea can be made by using hydraulically atomized sulfur using absolutely only sulfur and urea as raw materials.

In Example XIV, we show that slow-release sulfur coated urea can be made using hydraulic nozzles at much lower temperatures than is practical, if not impossible, with pneumatic nozzles. The sulfur coating drum used is the same as that used in previous examples, having no flights and only a smooth surface on the inside. In subsequent examples, the sulfur coating drum was modified to utilize the coating advantages taught in Blouin's patent application Ser. No. 382,153, filed July 24, 1973. As shown in Example XIV, Blouin's teachings are not required to make a sulfur only product with hydraulic atomizing. It does, however, present a better urea target for the nozzles and has shown that it improved the production of sulfur-coated urea, both sulfur only and sulfur with one or more additional coatings. Since Blouin's work was done while under the employment of TVA and whereas if the patent rights are obtained they will belong to TVA; and since our work is being done while under the employment of TVA and whereas any patent rights we obtain will belong to TVA, it was only practical that we conduct these and all future tests using the falling curtain technique of Blouin's where it is deemed of advantage.

In Example XV it is shown that the falling curtain technique can be used in connection with the hydraulic pressure atomizing technique to form a slow-release fertilizer using only sulfur and urea with low processing temperatures and provided other process conditions are properly controlled.

Example XVI shows dramatically the effect of temperature on the production of a slow-release fertilizer coated with sulfur only. FIG. 9, which is a graphic picture of the results of the test described in Example XVI, shows that the optimum average urea temperature in the sulfur coating drums for the sulfur-coated urea produced hydraulically must be completely different from that used when the sulfur-coated urea is produced pneumatically as was previously described in like manner in FIG. 4. Since in Examples XIV, XV, and XVI the substrate urea was unfortunately precoated with 1 percent Barret clay by our urea supplier to prevent caking in shipment, we show in Example XVII infra that this is not an integral part of our process by using urea granules chemically conditioned by the supplier to prevent caking in shipment to us. This urea was void of any precoating dust whatsoever.

EXAMPLE I

Minus 6-plus 10-mesh commercial spray drum-granulated urea was fed to the pilot plant preheater, which is 2 feet in diameter and 6½ feet long, at a rate of 1620 pounds per hour. The temperature of the granules increased from 70° F. to 150°F during passage through the preheater. The temperature of the radiant heating elements was 977°F and the temperature of the preheater shell was above the fusion point of urea. (Originally this value was reported to be about 271°F, but later work has shown that it was over 275°F.) The drum revolved at 37 percent of its critical speed and a retaining ring at its discharge end maintained the percent loading at 29 percent. The uninterrupted contact time (U.C.T.) was 1.18 seconds and the heat transfer rate, Q, was 0.18 Btu per second square foot giving a heat transfer, $q$, of 0.21 Btu per square foot per contact. Examination of granules entering and leaving the preheater reveals that the surface of the granules was significantly smoother and more uniform after passage through the preheater. The increased temperature and improved surface condition of the granules after the preheating step make the granules more receptive to uniform coating with materials such as molten sulfur. Examination of a photomicrograph of a cross section of urea granules that have passed through the preheater and subsequently coated with molten sulfur reveals a dark area on the surface of the granule adjacent to the layer of sulfur which shows the effect of the preheating step, i.e., superficial fusion on the surface of the granule, and the rolling action have caused the gas bubbles to be released from the surface of the granules and allowed a dense, smooth shell to form. Also, crystal protrusions and surface irregularities are substantially eliminated by this treatment.

EXAMPLE II

Minus 6- plus 9-mesh TVA experimental pan-granulated urea was fed to the pilot-plant preheater of Example I at a rate of 1440 pounds per hour. The temperature of the granules increased from 84°F to 172°F during the passage through the preheater. The temperature of the heating element was 1050°F and the temperature of the preheater shell was above the fusion point of the urea. The drum revolved at 37 percent of its critical speed and a retaining ring at its discharge and maintained the percent loading at 29 percent. The uninterrupted contact time (U.C.T.) was 1.18 seconds and the heat-transfer rate, Q, was 0.18 Btu per second square foot giving a heat transfer, q, of 0.21 Btu per square foot per contact. This treatment caused noticeable rounding and smoothing of the pan-granulated material much the same as that which occurred with the spray drum-granulated material used in Example I, supra. A photomicrograph of a cross section of pan-granulated urea granules subjected to the aforementioned preheating treatment and subsequently coated with molten sulfur shows the dense, smooth surface imparted to the granules by the subject preheating step and the uniform coating of sulfur which readily adhered to the pretreated granules.

EXAMPLE III

Minus 6- plus 10-mesh commercial spray drum-granulated urea was coated with sulfur by means of molten sprays during test operation of our 1-ton-per-hour pilot plant. Various proportions of coatings were applied at various production rates under various process conditions to evaluate for product evaluation. The effectiveness of the meetings obtained under each condition was evaluated by determining the proportion of urea that dissolves when 50-gram samples of the coated product were placed in 250 milliliters of water and maintained at 100°F for periods of 7 and 14 days, The amount of urea in the solution at the end of the specified period was determined either by chemical analysis or by the use of an Abbe refractometer.

The pilot plant was operated at net production rates ranging from 0.25 to 1.0 ton per hour. Coatings of both sulfur and wax were applied to the urea in most tests while sulfur alone was used for coating the granules in some tests. The preheating step was used to prepare the granules for coating in all tests. A conditioning agent was used to reduce the stickiness of the products that received a wax secondary coating. A small amount of coal tar was added to the wax to prevent attack and destruction of the wax coating by microorganisms in the soil.

Variables affecting production rates and quality of the coated products included the following:

1. the amount of heat transferred per uninterrupted contact in the preheater, $q$, and the substrate exit temperature.
2. rotational speed of sulfur-coating drum.
3. temperature of the product in the coating drum.
4. temperature of sulfur sprays.
5. position of sulfur sprays and number of sprays used.
6. coating weights of sulfur and wax and total coating weights.
7. temperature and volume of atomizing air.
8. type of spray nozzles used.
9. size and shape uniformity of substrate material.
10. depth of material in coating drum.
11. roughness of the interior of the drum.
12. temperature at which wax coating is applied.

Summary data showing the effects of the most significant process variables are shown in table I below and discussed infra.

Table I

| | Operating Conditions for Sulfur-Coating Tests | | | |
|---|---|---|---|---|
| Test No. | SCU-28A | SCU-32C | SCU-34A | SCU-34B |
| Substrate, type | Spray drum granulated urea | | | |
| Screen analysis, mesh % | +6 = 0.3 | +6 = 0.0 | +6 = 0.0 | +6 = 0.0 |
| | −6+7 = 0.8 | −6+7 = 9.1 | −6+7 = 8.9 | −6+7 = 8.9 |
| | −7+8 = 41.0 | −7+8 = 71.9 | −7+8 = 71.3 | −7+8 = 71.3 |
| | −8+9 = 47.2 | −8+9 = 19.0 | −8+9 = 19.2 | −8+9 = 19.2 |
| | −9+10 = 7.2 | −9+10 = 0.4 | −9+10 = 0.4 | −9+10 = 0.4 |
| | −10+12 = 2.0 | −10+12 = 0.2 | −10+12 = 0.1 | −10+12 = 0.1 |
| | −12 = 1.5 | −12 = 0.2 | −12 = 0.1 | −12 = 0.1 |
| Feed rate, lb/hr | 1610 | 1620 | 810 | 1620 |
| Preheater | | | | |
| Substrate exit temp., °F | 145 | 148 | 175 | 150 |
| Retention time, min. | 9 | 9 | 17 | 9 |
| Rpm | 20 | 20 | 20 | 20 |
| Sulfur-coating drum | | | | |
| Sulfur feed rate | | | | |
| Per nozzle, lb/hr | 64.5 | 85.5 | 23.2 | 45.0 |
| Total, lb/hr | 258 | 342 | 185 | 360 |
| Sulfur feed temp., °F | 299 | 305 | 306 | 306 |
| Spray nozzles | | | | |
| Number | 4 | 4 | 8 | 8 |
| Distance to bed, in. | 5⅝ | 4¾ | 5¼ | 4¾ |
| Sulfur flow control orifice | | | | |
| Size, in. | 0.028 | 0.028 | 0.018 | 0.018 |
| Atomizing air | | | | |
| Volume per nozzle, scfm | 5.5 | 5.5 | 5.5 | 5.5 |
| Temp. at nozzle tip, °F | 278 | 280 | 296 | 296 |
| Rpm | 21 | 24 | 24 | 24 |
| Retention time, min. | 4.8 | 6.5 | 11 | 6.5 |
| Retaining ring height, in. | 2 | 3¾ | 3¾ | 3¾ |
| Temp. of sulfur coated urea leaving, °F | 163 | 175 | 180–185 | 188 |

| Test No. | SCU-38A | SCU-38C | SCU-39B | SCU-45A |
|---|---|---|---|---|
| Substrate, type | | | | |
| Screen analysis, mesh % | +6 = 0.0 | +6 = 0.0 | +6 = 0.0 | +6 = 0.0 |
| | −6+7 = 5.2 | −6+7 = 7.0 | −6+7 = 9.0 | −6+7 = 9.8 |
| | −7+8 = 68.5 | −7+8 = 69.6 | −7+8 = 70.5 | −7+8 = 70.7 |
| | −8+ = 24.7 | −8+9 = 22.4 | −8+9 = 19.5 | −8+9 = 18.4 |
| | −9+10 = 0.6 | −9+10 = 0.6 | −9+10 = 0.5 | −9+10 = 0.6 |
| | −10+12 = 0.3 | −10+12 = 0.1 | −10+12 = 0.2 | −10+12 = 0.2 |
| | −12 = 0.7 | −12 = 0.3 | −12 = 0.3 | −12 = 0.3 |

Table I – Continued

Operating Conditions for Sulfur-Coating Tests

| Test No. | SCU-28A | SCU-32C | SCU-34A | SCU-34B |
|---|---|---|---|---|
| Feed rate, lb/hr | 720 | 720 | 1620 | 808 |
| Preheater | | | | |
| Substrate exit temp., °F | 214 | 174 | 143–145 | 145 |
| Retention time, min | 9 | 9 | 9 | 9 |
| Rpm | 24 | 24 | 20 | 20 |
| Sulfur-coating drum | | | | |
| Sulfur feed rate | | | | |
| Per nozzle, lb/hr | 29.8 | 28.5 | 27.1 | 8.2 |
| Total, lb/hr | 238 | 228 | 217 | 66 |
| Sulfur feed temp., °F | 305 | 305 | 305 | 305 |
| Spray nozzles | | | | |
| Number | 8 | 8 | 8 | 8 |
| Distance to bed, in | 5¼ | 5¼ | 4¾ | 5¼ |
| Sulfur flow control orifice | | | | |
| Size, in. | 0.018 | 0.018 | 0.018 | 0.018 |
| Atomizing air | | | | |
| Volume per nozzle, scfm | 5.5 | 5.5 | 5.5 | 5.1 |
| Temp. at nozzle tip, °F | 298 | 295 | 295 | 294 |
| Rpm | 24 | 24 | 24 | 24 |
| Retention time, min. | 11 | 11 | 6.5 | 11 |
| Retaining ring height, in. | 3⅜ | 3⅜ | 3⅜ | 3⅜ |
| Temp. of sulfur coated urea leaving, °F | 220–225 | 200–202 | 178 | 160 |

| Test No. | SCU-28A | SCU-32C | SCU-34A | SCU-34B |
|---|---|---|---|---|
| Total coatings, % by analysis | 16" | 21 | 22" | 22 |
| Dissolution rates, % | | | | |
| First week | 51" | 29 | 0.5" | 10 |
| Second week | 59" | 32 | 1.0" | 13 |
| Sulfur yield, %" | 77" | 86" | 90" | 90" |
| Wax-coating drum | | | | |
| Temp. of entering coated material, °F | 156 | 165 | 162–168 | 176 |
| Temp. of wax and coal tar mixture, °F | 226 | 222 | 227 | 225 |
| Rpm | 14 | 14 | 14 | 14 |
| Retention time, min. | ¼ | ¼ | ½ | ¼ |
| Wax applied, % of total product | 2.2 | 2.0 | 2.8 | 2.8 |
| Coal tar applied, % of total product | 0.26 | 0.26 | 0.23 | 0.25 |
| Fluidized cooler | | | | |
| Temp. of wax material entering, °F | 153 | 160 | 160 | 172 |
| Temp. of cooling air entering, °F | 85 | 82 | 81 | 85 |
| Temp. of wax material leaving, °F | 88 | 88 | 81 | 86 |
| Temp. of air leaving, °F | 90 | 91 | 87 | 92 |
| Conditioning drum | | | | |
| Rpm | 12 | 12 | 12 | 12 |
| Retention time, min. | 3.5 | 3.5 | 7 | 3.5 |
| Conditioning agent, % of total product | 2.2 | 1.8 | 2.1 | 1.9 |

| Test No. | SCU-38A | SCU-38C | SCU-39B | SCU-45A |
|---|---|---|---|---|
| Total coatings, % by analysis | 24 | 24 | 17" | 13" |
| Dissolution rates, % | | | | |
| First week | 25 | 15 | 17" | 20" |
| Second week | ≈35 | ≈20 | 19" | — |
| Sulfur yield, %" | 90" | 96" | 91.5" | 84" |
| Wax-coating drum | | | | |
| Temp. of entering coated material, °F | — | — | 160 | 160 |
| Temp. of wax and coal tar mixture, °F | — | — | 225 | 226 |
| Rpm | 14 | 14 | 14 | 14 |
| Retention time, min. | ½ | ½ | ¼ | ½ |
| Wax applied, % of total product | No wax was applied | | 3.1 | 3.3 |
| Coal tar applied, % of total product | No coal tar was applied | | 0.26 | 0.27 |
| Fluidized cooler | | | | |
| Temp. of wax material entering, °F | 198 | 170 | 170 | 160 |
| Temp. of cooling air entering, °F | 94 | 92 | 83 | 83 |
| Temp. of wax material leaving, °F | 96 | 94 | 84 | 83 |
| Temp. of air leaving, °F | 101 | 96 | 88 | 84 |

Table I—Continued

Operating Conditions for Sulfur-Coating Tests

| Test No. | SCU-28A | SCU-32C | SCU-34A | SCU-34B |
|---|---|---|---|---|
| Conditioning drum | | | | |
| Rpm | 12 | 12 | 12 | 12 |
| Retention time, min. | 7 | 7 | 3.5 | 7 |
| Conditioning agent, % of total product | No conditioner was applied | | 2.1 | 2.3 |

"These are average coating and dissolution rates.
"Sulfur yield data should be considered to be ±10 percent of the actual value.

Effects of Preheater Heat Transfer per Contact and Substrate Exit Temperature These variables play an important part in preparing fusible materials for subsequent coating operations. The temperature of the coated product depends largely upon the temperature of the material leaving the preheater. The temperature of the product from the preheater is a function of the substrate throughput rate and heat input to the preheater. The heat transferred per contact, $q$, as discussed in the text is the major variable in determining how much surface improvement the granules will receive from the preheater.

Effects of Coating Drum Speed on Coating Efficiency

Specific tests were made to determine the effects of coating drum speed on coating efficiency. Using spray drum-granulated urea at a production rate of 1 ton per hour, the speed of the 4-foot-diameter coating drum was varied between 18.5 and 20 revolutions per minute (48–75 percent of critical speed) and dissolution rates were determined on the products made at each drum speed.

The results are shown in FIG. 7 supra. These data show that the quality of the products increased as the speed of the coating drum was increased up to about 75 percent of critical speed. At the maximum speed (75 percent of critical) carryover of material became high and sulfur buildup on the coating drum increased. The actual maximum practical coating drum speed of each product and condition would be established by observation of the action in the drum.

The Effect of Product Temperature in Sulfur-Coating Drum on Product Quality

Figure 4:
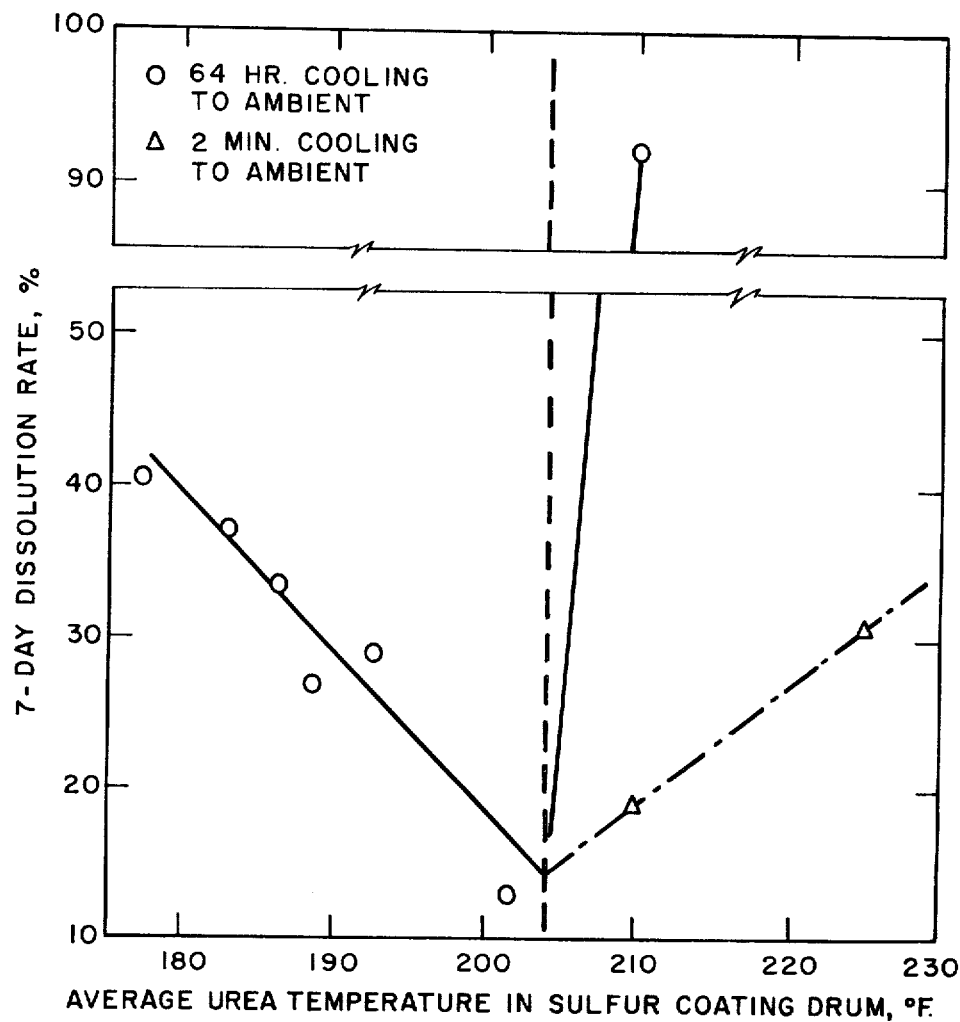
FIG. 4 shows the effects of urea temperature in the sulfur-coating drum of dissolution of sulfur-coated urea with no seal coating. It was made from data we obtained from our earliest work and from our more recent work.

As would be expected, sulfur coverage of granules is better at higher coating temperatures than at lower temperatures, and lower coating weights are required to obtain the samd dissolution rates when no wax sealer is used. FIG. 4, which includes some results from our more recent work, shows the effect of coating temperature on dissolution rates of sulfur-coated urea with no seal coating. However, poorer dissolution rates are obtained when the sulfur-coated granules are coated with wax at the higher temperatures. The reason for the latter results has not been identified.

Effects of Sulfur Spray Temperature

In our earliest work, although specific data on the effects of sulfur spray temperature on coating efficiency were not obtained, a sulfur spray temperature in the range of 300° to 305°F appeared to give the best results. Allowing for cooling by the spray action, the sulfur should contact the substrate material near the maximum fluidity temperature of 290°F when the temperature leaving the sprays is around 300° to 305°F. Later in our work, there was no noticeable effect on the product quality as long as the sulfur spray temperature was between 275° and 315°F.

Effects of Spray Position and Number of Sprays on Coating Efficiency

We have determined that the best position for the sulfur sprays is over the upper level of the bed. At this location, the spray strikes the fastest moving portion of the bed and essentially all granules pass under the spray on each cycle of material.

The effects of sulfur spray rates on product quality were evaluated by operating the pilot plant at production rates of 0.5, 0.75, and 1.0 ton per hour under the best sulfur-spraying conditions known at that time. Only a 20-percent total coating was required to obtain a 30-percent dissolution rate in 7 days at the 0.5-ton-per-hour rate while a total coating of 22.5 percent was required to obtain the same dissolution rates when the product rate was increased to 0.75 to 1.0 ton per hour.

The effect of increasing production rate with a corresponding increase in number of spray nozzles are evaluated by operating the pilot plant with eight spray nozzles at a production rate of 1 ton per hour and using only four spray nozzles to produce 0.5 ton per hour. The operating conditions were similar for both tests and the sulfur spray rate per nozzle was the same. The material produced at 0.5 ton per hour had a dissolution rate of 30 percent in 7 days with a 20-percent total coating while the product made at 1.0 ton per hour required only 16.5 percent total coating to give the same dissolution rate. Thus, by increasing the number of nozzles and keeping production rate per nozzle the same, a significant improvement was made in the quality of the product.

In our more recent work, we increased the number of spray nozzles to 15 by installing another sulfur header located parallel to the existing unit. At the 1-ton-per-hour production rate and the same coating conditions the product quality remained the same. The advantage of more spray nozzles and thus more sprayed area was offset by the location of the second header which had to be installed in a position where its sprays were less efficient than those of the primary header.

In all of these tests, the sulfur-coated urea received a subsequent coating of wax, coal, tar, and conditioner.

Effects of Coating with Sulfur Alone and With Use of Wax Sealer on Product Dissolution Rates The sulfur coating pilot plant was operated at 0.5-ton-per-hour production rate. Portions of the sulfur-coated product were subjected to dissolution tests without further treatment while other portions were further coated with 3 percent wax, 0.25 percent coal tar, and 2.0 percent conditioner before the dissolution tests. The results of dissolution tests for these two products are shown in FIG. 5. The dissolution rates obtained with a coating of sulfur, wax, coal tar, and conditioner were only slightly lower than for the same total coating weight of sulfur alone. These data show that a sulfur-coated product with satisfactory controlled-release characteristics can be produced without the use of a secondary sealer.

EXAMPLE IV

Other tests were carried out as in Example III supra, except TVA experimental pan-granulated product was used on the substrate material. This material, produced in the TVA pilot-plant pan granulator, ranged in size from minus 5- plus 8-mesh to forestry size product, i.e., minus 4- plus 6-mesh. The pan-granulated products were smooth, spherical, and of good quality. The forestry size material had more surface imperfections than the smaller product.

In the pilot-plant work with the pan-granulated products, only the preheater and sulfur-coating drum were used because the wax coating, cooling, and conditioning had not been installed at that time. Samples of the product from the sulfur-coating drum were coated with wax, coal, tar, and conditioner in laboratory equipment for use in dissolution rate test.

The preheater and sulfur-coating drum preferred satisfactorily with the pan-granulated products at production rates ranging from 0.25 to 1.0 ton per hour. Total coating weights (including 3.0 percent wax, 0.25 percent coal tar, and 2.0 percent conditioner) ranging from 16.5 to 24.0 percent were tested. Sulfur dissolutions to the individual spray nozzles was good; the rate of flow to each nozzle was within 6 percent of the average nozzle flow. The product from the coating drum had a uniform appearance. Dissolution rate data for the tests with pan-granulated material are tabulated below.

| Product size, mesh | Production rate, ton/hr | Total coating wt. % | Dissolution rate, 7 days | 14 days |
|---|---|---|---|---|
| −5+8 | 1.0 | 20 | 13 | 19 |
| −5+8 | 0.5 | 20 | 11 | 15 |
| −5+8 | 0.25 | 21 | 20 | 26 |
| −5+8 | 0.5 | 24 | 5.6 | 6.4 |
| −5+8 | 0.5 | 17.5 | 29.6 | — |
| −5+8 | 0.5 | 16.4 | 33.9 | — |
| −4+6 | 0.5 | 18.0 | 32 | 40 |

Most of the dissolution rates were considered satisfactory for each coating level and were approximately the same as those obtained in later tests with commercial spray drum-granulated material. The dissolution rates for the forestry size (−4 +6 mesh) material were higher than expected. The probable reason for the relatively poor results with the large size urea was that only four spray nozzles were operable during this test. Eight nozzles were used in the other tests. Later conducted tests (Example III, supra) indicate poorer quality coatings are obtained when the number of spray nozzles is reduced.

EXAMPLE V

In still other tests, commercial, air-prilled urea was coated with sulfur in our 1-ton-per-hour pilot plant. Initial coating tests were performed on standard size prills (−9 +14 mesh) at production rates of 0.25 and 0.50 ton per hour. In these tests, only the pilot-plant preheater and sulfur-coating drum were used and the wax, coat tar, and conditioner were applied to representative samples in laboratory equipment. In a later series of tests large, air-prilled urea (−8 +12 mesh) supplied by a commercial producer was coated with sulfur, wax, coal tar, and conditioner in the pilot-plant equipment at rates of 0.25, 0.50, 0.75, and 1.0 ton per hour. Various sulfur coating levels were tested.

In general, mechanical operation of the pilot plant was satisfactory when causing the prilled products. There was a tendency for the smaller prills to form agglomerates in the coating drum because of molten sulfur and urea dripping onto the bed in areas where movement of the bed was slow. Dissolution rates for the sulfur-coated urea prills produced under various conditions are given in the following tabulation.

| Size prill | Production rate, ton/hr | Total coating wt. % | Dissolution rate, % 7 days | 14 days |
|---|---|---|---|---|
| −9 +14 mesh | 0.25 | 32 | 12 | 15 |
| −9 +14 mesh | 0.50 | 34 | 29 | 33 |
| −8 +12 mesh | 0.25 | 26 | 25 | 38 |
| −8 +12 mesh | 0.50 | 25 | 20 | 24 |
| −8 +12 mesh | 0.75 | 28 | 20 | 29 |
| −8 +12 mesh | 1.00 | 24 | 38 | — |

As would be expected, a higher coating weight is required for the smaller prills to give dissolution rates equivalent to those obtained with the larger, granular urea because of the higher surface to volume ratio for the smaller particles. The larger (−5 +12 mesh) prills had a higher dissolution rate than was expected for particles of this size, probably because of the presence of holes or dimples in many of the larger prills.

EXAMPLE VI

Various proportions of coatings were applied to minus 6- plus 10-mesh spray drum-granulated urea during operation of our pilot plant at the design production rate of 1 ton per hour. Dissolution rates were determined for the products at several coating levels and the results compared with similar tests conducted on products made in the small TVA sulfur-coating pilot plant at the design production rate of 250 pounds per hour. The effect of coating weight on dissolution rates for products made in the two TVA pilot plants are shown in FIG. 6. These data show that the quality of the products made in our 1-ton-per-hour pilot plant is consistently better than the quality of products with similar coating weights produced in the smaller plant. Process conditions were generally about the same during operation of each pilot plant. The principal differences between the two pilot plants were the types of substrate preheaters, the design of the sulfur spray systems used in each plant, and the method of cooling the finished product. The superior quality of the products made in our pilot plant must be attributable largely to the improved design and operating technique useud in our plant.

EXAMPLE VII

Example of the effect of quick cooling on the quality of sulfur coating in our process was observed in photomicrographs of two sulfur-coated urea granules.

The granule which was cooled slowly, as would be accomplished in a conventional rotary-type cooler, evidences large sulfur crystals, and fissures or cracks develop readily in the coating shell and allow mixture to penetrate. This moisture penetration dissolves out the urea fertilizer, thereby destroying its controlled-release quality.

The granule which was cooled quickly (almost instantaneously) in a fluid bed cooler to decrease its temperature from about 210° to about 90°F when subjected to electron microscopic analysis revealed that the coating on this granule is essentially small crystals held together by amophrous sulfur. This coating remained relatively free of cracks and fissures.

By way of proof of the better quality coating attained with the quick-cooling procedure, the dissolution rates of the same type urea granules coated the same way, each with a 23-percent total coating, are shown below.

| Type cooling | 7-day dissolution of urea in water, % |
|---|---|
| Quick | 19 |
| Slow | 40 |

In 7 days only 19 percent of the quick-cooled material dissolved as compared with 40 percent of the slowly cooled product. This shows that the material made by quick cooling would be more resistant to moisture and therefore a better controlled-release product than that produced with slow cooling.

EXAMPLE VIII

Minus 6- minus 10-mesh commercial spray drum-granulated urea was fed to the pilot-plant preheater of Examples I and II at aa rate of 3240 pounds per hour. The temperature of the granules increased from 86° to 146°F during their passage through the preheater. Two banks of heating elements were in operation. The preheater drum speed was 65 percent of critical. The percent loading of the drum was maintained at 24 percent. At a result of the other conditions, the preheater shell was above the fusion point of the urea. The uninterrupted contact time (U.C.T.) was 0.62 second and the heat-transfer rate, Q, was 0.29 Btu per second square foot giving a heat transfer, $q$, of 0.18 Btu square foot per contact. This treatment caused noticeable rounding and smoothing of the urea much the same as that which occurred with the urea used in Examples I and II supra, although the urea feed rate was 100 percent and 130 percent more, respectively.

This example from our more recent work shows the validity of our teaching as fully described in the text.

Additional resistance heating elements were installed in the preheater to substantially increase the heating capacity. Because the heat input into the drum was increased, the heat-transfer rate, Q, to the material in the preheater increased. Therefore, the uninterrupted contact time had to be decreased to keep the heat-transfer per contact, $q$, preferably about the same as in Examples I and II and certainly below 0.28 Btu per squre foot. When $q$ was allowed to exceed 0.28 Btu per square foot, then the surface melting of the urea because excessive. The urea, when in contact with the shell, because tacky and adhered to the preheater shell thus becoming the shell itself. A buildup of fused material on the wall of the preheater resulted that the equipment became inoperative in a short period of time. When the preheater was operated with q in the same range as in Examples I and II, the granules showed noticeable improvement in the same manner as those of Examples I and II, and a uniform coating of sulfur readily adhered to the preheated granules. Further, there was no adherence of the granules to the walls of the preheater. The theoretical description of the process in the text exactly describes our experimental findings. It was further determined in further tests that the preheater could be run at rotational speeds up to 75 percent of its critical speed while producing a product with a smooth fused surface.

EXAMPLE IX

Granular urea was produced by TVA in a pilot-plant operation which was run concurrently with the sulfur-coating pilot plant. The granulated urea, which was minus 5 plus 8 Tyler mesh and substandard in physical characteristics, was fed directly from the granulation unit to the sulfur-coating pilot plant. No subcoating or conditioner of any kind was added to the urea. The still warm urea (120°F) was fed to the preheater continuously at the rate of 725 pounds per hour. Following a retention time of 17 minutes, the urea was discharged to the sulfur-coating drum at 175 to 185°F. Commercial-grade bright Frasch sulfur with an analyziz of 400 parts per million carbon and 55 parts per million ash was used as the coating material. The sulfur contained no plasticizers or other additives. It was fed to the sulfur nozzles at 307°F. The sulfur was sprayed onto the urea from the sulfur spray header of our invention which contained eight pneumatic atomizing spray nozzles. The air used to provide the atomization was preheated to 299°F. The spray tipe of the nozzles were positioned 5 inches directly above the most active portion of the bed of granules. The sulfur was sprayed directly downward. An equal sulfur flow to each nozzle of 32.3 pounds per hour, plus or minus 6 percent, was controlled by the use of 0.018-inch flow control orifices located immediately upstream of each nozzle. The rotational speed of the 4-foot-diameter by 6-foot-long sulfur-coating drum was 24 revolutions per minute or 63 percent of its critical speed. After a retention time of 11 minutes, the sulfur-coated urea was discharged continuously from the sulfur-coating drum at a temperature of 195° to 202°F. All of the sulfur coating occurred between the minimum inlet temperature of 175°F and the maximum outlet temperature of 202°F. Absolutely no coating of any kind other than sulfur was applied to the urea. For an average sulfur coating of 27 percent, the dissolution rate of the resulting product as measured in 100°F water was 24 percent in 7 days.

EXAMPLE X

Commercial-grade drum-granulated urea (−6 +10 Tyler mesh) was obtained from supplier C.A. The urea had received C.A.'s standard application of 1 percent by weight Barnet clay conditioner to prevent caking in shipment and storage. It was preheated to 200°F by the process of our invention and then spray coated with commercial bright Frasch sulfur at 321°F using the spray header of our invention. The bed of urea being sprayed was maintained between 195° and 200°F. Following the discharge of coated granules from the sulfur-coating drum at the rate of about one-half ton per hour, they were cooled to 90°F in about 2 minutes as they passed through the fluid bed cooler. Later on in this continuous process, the temperature of the sulfur was decreased to 307°F and all other conditions were maintained the same. In neither case was any coating other than sulfur applied to the urea, nor was any substance added to the sulfur before it was sprayed. With a sulfur coating equal to 26 percent of the total product by weight, the urea dissolution rate in 100°F water was 65 percent and 14 percent, respectively, in 7 days. Liquid sulfur is known to switch from a ring molecular structure to a chain molecular structure at 318°F. The chain molecular structure is extremely more viscous and thus atomizes poorly. On the other hand, it is much more likely to solidify in the desired sulfur $\mu$ elastic form. In fact, the material coated with sulfur sprayed at 321°F has 8 percent of its sulfur in the sulfur $\mu$ form, versus approximately 5 percent of the material sprayed at 307°F. Yet the urea sprayed with the 307°F sulfur has a much lower dissolution rate because of the better atomization given the low-viscosity material by the atomizing nozzles. Thus, the importance of not exceeding the temperature of 318°F was demonstrated. The clay subcoating on the urea in this example prevents the product from being one of only urea and sulfur, but as discussed in the text it has very little effect on the coating under these conditions. In our case, the conditioned urea was used only in perfecting the coating, but it is quite evident that an anticaking conditioner must be applied to the urea which is shipped over long distances and/or stored before coating with sulfur. Therefore, these results demonstrate not only the importance of spraying sulfur below 318°F but also provide proof that our coating is compatible with the 1 percent clay conditioner. Other results not fully reported herein have shown that an increase in Barnet clay conditioner to 2 percent, which sometimes is applied by various manufacturers, decreases the effectiveness of the sulfur coating.

ously to the sulfur-coating process of our invention at the rate of 720 pounds per hour. The urea was preheated to 150° to 213°F before being fed to the sulfur-coating drum where the temperature of the granules being coated was allowed to vary from 190° to 225°F. As the sulfur-coated urea discharged from the coating drum, samples from the flow were cooled in approximately 2-pound quantities by various means and at various rates. No coating other than sulfur was applied nor was any substance added to the sulfur before it was sprayed. Table II below gives a comparison of the results. Note that the manner of cooling has no effect on the dissolution rate of the material produced at the 190°and 200°F temperature levels, but quick cooling is essential when coating occurs in the 210° and 220°F temperature ranges. Further note that the quicker the product is cooled when made at the higher temperatures, the lower the dissolution rate of the final product. Just cooling the product below 203.9°F, which is the monoclinic to orthorhombic transition temperature, is not sufficient to stop the degradation of the product. The data show that the product should be cooled as quickly as possible and as low as practical. These data further demonstrate that the quality of the product improves as the coating approaches the 203.9°F transition temperature.

Table II

Seven-Day Dissolution Rates for Urea Coated Only With Sulfur and Cooled at Various Rates

| | | Temperature of product leaving the sulfur-coating drum | | | | | | | |
|---|---|---|---|---|---|---|---|---|---|
| | | 220°–225°F | | 210°–212°F | | 200°–202°F | | 190°–192°F | |
| Type of cooling | Cooling time | 7-day dissolution, % | Total coating, % | 7-day dissolution, % | Total coating, % | 7-day dissolution, % | Total coating, % | 7-day dissolution, % | Total coating, % |
| Vacuum bottle to room temp.[a] | ≈64 hr. | — | — | 92 | 23 | 13 | 24 | 17 | 24 |
| 3 lb sample bag to room temp. | ≈2½ hr. | 82 | 24 | 40 | 23 | 13 | 24 | 20 | 24 |
| 3 lb sample bag to 140°F[b] | ≈30 min. | — | — | 37 | 23 | — | — | — | — |
| 3 lb sample bag to 150°F[b] | ≈25 min. | — | — | — | — | 13 | 24 | 20 | 25 |
| 3 lb sample bag to 170°F[b] | ≈20 min. | — | — | 30 | 23 | 14 | 25 | 18 | 25 |
| 3 lb sample bag to 186°F[b] | ≈10 min. | — | — | 29 | 23 | 13 | 24 | — | — |
| Lab fluid bed cooler to 150°F[c] | ≈30 sec. | — | — | — | — | 14 | 24 | 21 | 24 |
| Lab fluid bed cooler to 125°F[c] | ≈45 sec. | — | — | — | — | 14 | 24 | 18 | 24 |
| Lab fluid bed cooler to 100°F[c] | ≈90 sec. | — | — | 25 | 23 | 12 | 24 | 18 | 24 |
| Pilot-plant fluid bed cooler to 96°F | —[d] | — | — | 23 | 23 | 13 | 24 | 18 | 24 |
| Lab fluid bed cooler to 85°–90°F[c] | ≈120 sec. | 31 | 24 | 19 | 23 | 15 | 24 | 17 | 24 |

[a] The product temperature dropped approximately 24°F the first 3 hr. and 10 min.
[b] The product after reaching this temperature was cooled in the lab fluid bed unit to 85°–90°F.
[c] The product after reaching this temperature was cooled in a 3-lb. bag to room temperature.
[d] The product leaving the sulfur-coating drum was retained in the system about 1½ min. before it entered the fluid bed cooler. The retention time in the cooler was approximately 7 minutes. The cooling rate was slightly lower and the product discharge temperature was slightly higher in the large fluid bed cooler because of its warmer cooling air.

EXAMPLE XI

Commercial-grade drum-granulated urea (−6 +10 Tyler mesh) and having an anticake conditioning coating of 1 percent by weight Barnet clay was fed continu-

AGRONOMIC TESTS

The use of fertilizers encapsulated with sulfur only of the invention to provide controlled dissolution of the plant nutrients is demonstrated by the following two agronomic tests.

EXAMPLE XII

Four sulfur-coated urea fertilizers produced in the TVA pilot plant was buried 1 inch deep in wet soil. After periods of 3 and 6 weeks, duplicate samples were dug up and analyzed to determine the nitrogen which remained. Two of the fertilizers were sulfur-coated ureas that had received the standard TVA seal coating which by weight percent of the final product was 3 percent wax, 0.25 percent coal tar, and 2 percent conditioner. Sulfur content of these fertilizers was 13 percent and 11 percent. They had a dissolution rate of the urea in 100°F water of 20 and 29 percent, respectively, in 7 days. The other two fertilizers were sulfur-coated urea without any seal coatings but with sulfur contents of 21 and 22 percent. They had dissolution rates of the urea in 100°F water of 19 and 32 percent, respectively, in 7 days. The four fertilizers were each tested at application rates of 167 and 335 milligrams of nitrogen per kilogram of soil. During the test period all of the samples were maintained under the same temperature and moisture conditions. The results of the test, as shown in Table III below, demonstrate that each of the fertilizers tested acts as a slow-release nitrogen fertilizer in soil.

Table III

Dissolution of Sulfur-Coated Ureas in Soil

| Sample identification | Sulfur, % | Wax, % | Coal tar, % | Diatomaceous earth, % | Total coat, % | Raw material costs[1] | Urea dissolution in 100°F water in 7 days | Nitrogen application rate, mg/kg of soil | Nitrogen recovered, mg/kg of soil 3 weeks | Nitrogen recovered, mg/kg of soil 6 weeks | Urea dissolved in wet soil, % 3 weeks | Urea dissolved in wet soil, % 6 weeks |
|---|---|---|---|---|---|---|---|---|---|---|---|---|
| SCU-131 | 21 | 0.0 | 0.0 | 0.0 | 21 | $0.77 | 19 | 167 | 113 | 78 | 32 | 54 |
|  |  |  |  |  |  |  |  | 335 | 219 | 145 | 35 | 57 |
| SCU-134 | 22 | 0.0 | 0.0 | 0.0 | 22 | 0.82 | 32 | 167 | 82 | 45 | 51 | 73 |
|  |  |  |  |  |  |  |  | 335 | 152 | 85 | 55 | 75 |
| SCU-161 | 13 | 3.0 | 0.25 | 2.0 | 18.25 | 2.28 | 20 | 167 | 81 | 40 | 51 | 76 |
|  |  |  |  |  |  |  |  | 335 | 186 | 94 | 45 | 72 |
| SCU-165 | 11 | 3.0 | 0.25 | 2.0 | 16.25 | 2.09 | 29 | 167 | 60 | 32 | 64 | 81 |
|  |  |  |  |  |  |  |  | 335 | 170 | 122 | 50 | 64 |

[1]Raw material costs for coated material per 100 pounds of nitrogen. These figures are based on actual raw material costs of the coating material, sulfur, wax, coal tar, and conditioner, which we experienced in our pilot plant. They do not include operating costs which should be less in the less involved sulfur only operation.

EXAMPLE XIII

Kentucky 31 fescue grass was established in pots containing 6.25 kilograms of dry soil and clipped at a height of 2 inches. To all but one pot either 750 or 1500 milligrams per pot of nitrogen was evenly applied in the form of one of the following fertilizers: (1) sulfur-coated urea with a sulfur coating of 13 percent by weight and seal coatings of 3 percent by weight wax, 0.25 percent by weight coal tar, and 2 percent by weight conditioner and a dissolution rate of the urea in 100°F water of 20 percent in 7 days; (2) same as (1) except a sulfur coating of 11 percent by weight and a water dissolution rate of 29 percent in 7 days; (3) sulfur-coated urea with a sulfur coating of 21 percent by weight, no seal coating, and a dissolution rate of the urea in 100°F water of 19 percent in 7 days; (4) same as (3) except a sulfur coating of 22 percent and a dissolution rate of 32 percent; and (5) urea without a coating. The remaining pot received no nitrogen fertilizer. Growing conditions of all of the pots were the same. The grass was clipped at a height of 2 inches every 4 weeks for 36 weeks for a total of nine harvests. The harvested grass was dried and weighed. FIG. 8 shows the total weight of grass harvested for each fertilizer during the 36 weeks and also the percentage of that harvest obtained in each successive 12-week period. The growth rate for the grass was much more uniform for the sulfur-coated ureas than for uncoated urea. Further, our most recently discovered sulfur-only fertilizer provided the most uniform growth of grass demonstrating the remarkable slow-release characteristics it possesses.

EXAMPLE XIV

Commercial-grade drum-granulated urea (−6 +10 Tyler mesh) was obtained from supplier C.A. The urea had received C.A.'s standard application of 1 percent by weight Barnet clay conditioner to prevent caking in shipment and storage. It was preheated to only 123°F by the process of our invention and then spray coated with commercial bright Frasch sulfur at 314°F. The production rate was three-fourths of a ton of sulfur-coated urea per hour. Eight hydraulic atomizing nozzles mounted in a single header were used to spray the sulfur. Sulfur was supplied to the nozzles at 630 psig. Atomization of the sulfur occurred as the high-pressure sulfur passed through the extremely small nozzle openings which were elliptical with an open area equivalent to a 0.011-inch-diameter circle. No air or other pressurized gas was used to increase atomization of the sulfur which was sprayed in a thin oval pattern. (Subsequent tests showed the type and manufacturing origin of the spray nozzles to be relatively unimportant to the process provided the nozzles atomized the sulfur to the same degree, and provided process conditions were maintained the same. Increasing the size of the nozzle and therefore the spraying capacity of a nozzle for a given hydraulic pressure does decrease the quality of the product.) The sulfur was sprayed directly downward onto the bed of cascading granules from a height of 5½ inches. This was the same relative position as that used in all of the previous examples where pneumatic atomizing spray nozzles were used. The sulfur-coating drum was the same used in the previous examples with the exception that all piping which was part of the pneumatic atomizing system was removed and replaced with the high-pressure piping required by the new hydraulic spraying system. During this test, the rotational speed of the 4-foot-diameter by 6-foot-long sulfur-coating drum was 24 rpm or 63 percent of critical speed. After a retention time of 6.8 minutes, the sulfur-coated urea was discharged continuously from the sulfur-coating drum at a temperature of 166°F. Samples of this material were taken and allowed to cool to room temperature over a 2-hour period. No seal coating of any kind was added to the material. With a sulfur coating of 19.5 percent by weight, the material gave a 7-day dissolution rate of 39 percent. This was the first time we know of that a sulfur-only slow-release fertilizer was made at low temperatures. All of the coating occurred between the inlet sulfur-coating drum temperature of 123°F and the discharge temperature of 166°F, clearly outside our previously claimed temperature limits for the substrate in the sulfur-coating drum of 170° to 203.9°F when using the pneumatic spraying process. A complete listing of the operating conditions is presented in Table IV under test SCU-94D. (For purposes of convenience, said Table IV is presented after Example XVII.)

The material produced by this test is not as good qualitywise as that which can be obtained using the pneumatic atomization process of our earlier invention, but it is much more operational. Sulfur dust was reduced in this test and others like it from 88 to 98 percent. Sulfur yield, as defined earlier, in this test was 100 percent. Safety problems associated with extreme dusting were eliminated.

EXAMPLE XV

Urea was coated with sulfur using the technique of spraying on a curtain of falling granules as described by Blouin's patent application Ser. No. 382,153, supra. The sulfur-coating drum of all previous examples was modified as follows to utilize Blouin's process. A 5-inch retaining ring was installed at the discharge end of the drum. Twenty-four lifting flights were installed in the drum at 15° intervals. The flights were straight with flat surfaces, 3 inches wide and 58 inches long. They were installed parallel to the axis of the drum and to increase their lifting capacity they were slanted 15° forward from the perpendicular with the shell of the drum. As the drum rotated the flights carried material out of the bed of granules and discharged it onto a collecting pan. The pan extended the length of the drum and was installed parallel to the axis of the drum and level with the horizontal with respect to its length. The pan was 20½ inches wide and was sloped counter to the direction of the rotation of the drum at an angle so that the granules cascaded down it. As the granules discharged from the pan, they struck a deflector plate which formed them into a continuous vertical curtain of free-falling granules. The hydraulic spray nozzles were positioned to spray perpendicularly onto the curtain of falling granules at a point 2 inches above the bottom of the falling curtain and from a distance of 5½ inches away. The nozzles in the header were 7¾ inches apart. As shown in Example XIV, this arrangement is not required to make a sulfur-only product. Tests have shown, however, that it improves the production of sulfur-coated urea both sealed and sulfur only. Therefore, it was only practical that we at TVA conduct this and all other future tests using the falling curtain technique. It has provided a better target for spraying and better mixing of granules. As a result of it, the rotational speed of the drum was reduced to 13 rpm for this test. The falling curtain is not responsible for any temperature changes in the sulfur-coating process.

Similar commercial urea to that used in Example XIV was preheated to 158°F by the process of our invention and then spray coated with commercial bright Frasch sulfur. Eight hydraulic atomizing nozzles, which were mounted in a single header, were used to spray the molten sulfur (311°F). Spraying pressure as 510 psig. Production rate of product was 1 ton per hour (see Table IV, test No. SCU-99-SO, for full operating conditions). Samples of material were taken as the sulfur-coated urea discharged from the sulfur-coating drum at the temperature of 166°F. No seal coating was applied. The samples were given no special cooling, but were allowed to cool to room temperature in a plastic sample bag before they were analyzed for dissolution rate.

A sulfur coating of 19.5 percent gave a 7-day dissolution rate of 27 percent. The increase in product quality over that in Example XIV is due both to the use of Blouin's technique and more optimum operating temperatures, as are fully covered in Example XVI, infra.

EXAMPLE XVI

Using urea similar to that used in Examples XIV and XV, sulfur-coated urea was made at the production rate of 1 ton per hour. The sulfur was sprayed by eight hydraulic nozzles. The sulfur-coating drum was equipped with flights and the sulfur was sprayed onto a curtain of falling urea as in Example XV supra. The proportions of sulfur and urea were maintained constant throughout the test. No seal coating of any kind was applied to the sulfur-coated product. The substrate urea temperature leaving the preheater of our invention was varied from 95°F (no preheating) to 187°F. Correspondingly, the temperature of the material leaving the sulfur-coating drum varied from 132° to 194°F, and the average urea temperature in the sulfur-coating drum varied from 114° to 191°F. The product was removed directly from the sulfur-coating drum and cooled in various manners and at various rates. The resulting dissolution rate data make it obvious that temperature requirements are completely different when making sulfur-coated urea with hydraulic nozzles rather than with pneumatic nozzles. A slow-release sulfur-coated urea fertilizer was produced without any preheating of the substrate urea whatsoever over ambient temperature conditions (95°F). Following its sulfur coating through the use of hydraulic pressure atomizing nozzles in our sulfur-coating drum, it received no cooling, but was piled on the floor in 1000-pound piles for cooling over a period of 4 days. This is the first time that a slow-release sulfur-coated urea fertilizer has ever been made without the use of preheating the substrate urea or in a one-step process. (See Table IV infra, test No. SCU-103A for complete process conditions.) In subsequent testing when the substrate urea was heated, some improvement was made in the final product. See FIG. 9 constructed solely from the data of this test. Whether the additional quality obtained by preheating and possibly quick cooling is economically justified would depend upon the desired use of the fertilizer and the particular economic conditions present at the time and place of its production.

In FIG. 4 we previously showed how that, for a given sulfur coating on the urea granules applied with the pneumatic nozzles, the 7-day dissolution rate decreased with an increase in the temperature of the granular material in the sulfur-coating drum until that temperature exceeded 203.9°F, at which time it increased sharply with an increase in the temperature of the granular material. Quick cooling of the product discharged from the sulfur-coating drum which had exceeded 203.9°F reduced the damage otherwise done to the coating. Our most recent data, as shown in FIG. 9, show that when using hydraulic nozzles, the optimum sulfur-coating temperatures are much lower. Using the same parameters of 7-day dissolution rate and average urea temperature in the sulfur-coating drum, the best average temperature for material cooled in the same manner but coated with hydraulic nozzles is only 176°F (see Table IV, SCU-103B) instead of 203.9°F. Quick cooling begins to have a definite effect on the material at an average urea temperature in the sulfur-coating drum of only about 160°F.

The physical characteristics of the sulfur coatings applied in this test were studied with the aid of an electron microscope. It was found that when urea is coated with pressure atomized sulfur with an average urea temperature in the sulfur-coating drum of 170°F and then cooled quickly, a mosaic texture is developed. This mosaic texture is well developed and is characterized by high ratios of the areas of crystalline to carbon desulfide-insoluble sulfur. The mosaic texture in such samples is different from that observed in the air-atomized sulfur-coated urea products previously studied in that the individual sulfur crystallites are poorly defined, and the inter-granular sulfur phase is present as random sheets rather than as the matrix usually found in the air-atomized products. Detailed study of the surfaces of pressure-atomized sulfur coatings failed to show evidence of plasticity in the intergranular sulfur phases. Thus, the compact texture of such sulfur coatings would seem to be a more rigid mosaic of sulfur phases, somewhat different from the partially flexible coatings observed in air-atomized sulfur coatings.

When pressure-atomized sulfur coatings are applied at average urea temperatures in the sulfur-coating drum of over 170°F and cooled slowly, large sulfur crystals grow at the expense of the amorphous sulfur and this results in massive sulfur textures that are defective and undesirable. Products made at temperatures below about 170°F regardless of cooling generally have variable mixtures of massive sulfur and poorly developed mosaics.

EXAMPLE XVII

Commercial-grade drum-granulated urea (−6 +10 Tyler mesh) was obtained from supplier C.A. The urea was not precoated with the normal 1 percent by weight Barnet clay conditioner. The supplier had instead sprayed the urea with formaldehyde solution to prevent caking. The urea was preheated to 141°F by the process of our invention and then fed to the sulfur-coating drum to make sulfur-coated urea at the production rate of 2 tons per hour. The sulfur at 310°F was sprayed by 16 hydraulic nozzles. The sulfur-coating drum was equipped with flights and the sulfur was sprayed onto a curtain of falling urea granules as in Examples XV and XVI with the exception that nozzles were arranged in two headers positioned so one sprayed onto the curtain 5½ inches above the second. Both sets of nozzles were 5½ inches from the curtain. As sulfur-coated urea discharged from the drum at the temperature of 170°F, a sample was taken and allowed to cool to ambient conditions over a period of 2½ hours. No seal coating of any kind was applied to the sulfur-coated product. A sulfur coating of 21 percent gave a product with a urea 7-day dissolution rate of 34 percent. Full operating conditions are given in Table IV under test No. SCU-110A.

Table IV

| Test No. | Operating Conditions for Sulfur-Coating Tests Using Hydraulic Atomizing Nozzles | | | | |
|---|---|---|---|---|---|
| | SCU-94D | SCU-99-SO | SCU-103A | SCU-103B | SCU-110A |
| Substrate, type | Spray drum-granulated urea (1% clay conditioner applied by the supplier) | | | | Spray drum-granulated urea (sprayed with formaldehyde solution) |
| Screen analysis, mesh % | +6 = 0 | +6 = 0.1 | +6 = 0.1 | | +6 = 0.2 |
| | −6 +7 = 11.0 | −6 +7 = 12.1 | −6+7 = 9.0 | | −6 +7 = 12.3 |
| | −7 +8 = 65.8 | −7 +8 = 68.3 | −7 +8 = 67.0 | | −7 +8 = 58.5 |
| | −8 +9 = 20.5 | −8 +9 = 17.9 | −8 +9 = 21.6 | | −8 +9 = 26.9 |
| | −9 +10 = 1.8 | −9 +10 = 1.1 | −9 +10 = 1.5 | | −9+10 = 1.7 |
| | −10 +12 = 0.4 | −10 +12 = 0.3 | −10 +12 = 0.4 | | −10 +12 = 0.2 |
| | −12 = 0.4 | −12 = 0.2 | −12 = 0.4 | | −12 = 0.2 |
| Feed rate, lb/hr | 1220 | 1620 | 1620 | 1620 | 3240 |
| Preheater | | | | | |
| Substrate exit temperature, °F | 123 | 158 | 95 (no preheating) | 169 | 141 |
| Retention time, min. | 9.3 | 7 | — | 7 | 3.5 |
| Rpm | 35 | Data not available | — | 35 | 28 |
| Sulfur-coating drum | | | | | |
| Sulfur feed rate | | | | | |
| Per nozzle, lb/hr | 40 | 46.5 | 50.9 | 50.5 | 52.5 |
| Total, lb/hr | 320 | 372 | 407 | 404 | 840 |
| Sulfur feed temperature, °F | 314 | 311 | 308 | 311 | 310 |
| Spray nozzles | | | | | |
| Number | 8 | 8 | 8 | 8 | 16 |
| Distance to bed, in. | 5½ | 5½ | 5½ | 5½ | 5½ |
| Spray tip opening, in. | 0.011 | 0.011 | 0.011 | 0.011 | 0.011 |
| Hydraulic pressure at nozzle tip, psig | 630 | 510 | 870 | 870 | 900 |
| Sulfur-coating drum | | | | | |
| Rpm | 24 | 24 | 13 | 13 | 20 |
| Retention time, min. | 6.8 | 12.6 | 12.6 | 12.6 | 7.1 |
| Retaining ring height, in. | 3¾ | 5 | 5 | 5 | 7.1 |
| Temperature of sulfur-coated urea leaving, °F | 166 | 166 | 132 | 182 | 170 |
| Sulfur coating, % by analysis | 20.5 | 19.5 | 21 | 21 | 21 |
| Dissolution rates, % | | | | | |
| First week | 39 | 27 | 45 | 21 | 34 |
| Sulfur yield, % | 100 | 99.5 | 100 | 100 | 100 |
| Seal coatings, % by analysis | 0.0 | 0.0 | 0.0 | 0.0 | 0.0 |
| Cooling | —*a* | —*a* | —*b* | —*c* | —*a* |

*a*Samples were collected from the discharge of the sulfur-coating drum and allowed to cool in 3-pound sample quantities without any cooling assistance to ambient conditions over a period of 2½ hr.
*b*Piled on the floor in 1000-pound piles without cooling. Cooling time to 100°F was 70 hr.
*c*Three-pound sample cooled in lab fluid bed cooler to 90°F in 3 min.

After sifting and winnowing through the data presented above as well as other data available to us, we have determined that the operating limits as well as the preferred and the most preferred conditions and variables for carrying out our process are as summarized below for both our pneumatic atomizing process and our hydraulic pressure atomizing process.

Pneumatic Atomizing Process

| Process Variables | Limits | Preferred | Most Preferred |
|---|---|---|---|
| Preheater | | | |
| Rotational speed, % of critical | 15–75 | 30–70 | 35–65 |
| Heat transferred per unit of shell area to the granules per contact, $q$, Btu/ft²-contact | 0.050–0.35 | 0.075–0.28 | 0.15–0.22 |
| | | (values vary with size of urea being preheated) | |
| Heat transfer rate between the drum and the granules in contact with it, $Q$, Btu/sec-ft² | | Provided the shell temperature is $\geq$ 275°F and the critical speed and drum loading are as indicated. | |
| Uninterrupted contact time between the preheater and the shell of the drum (U.C.T.) sec/contact | | These values must be in limits to give $q = Q(U.C.T.)$ provided $$(U.C.T.) = \frac{60 \cos^{-1}\frac{r-h}{r}}{\pi R}$$ | |
| Inside shell temperature, °F | $\geq$ 275 | >275 | >275 |
| Preheater drum loading, % | 5–40 | 10–35 | 20–30 |
| Preheater diameter, ft. | 0.5–10 | 2–6 | 2–4 |
| Sulfur coating | | | |
| Sulfur flow control orifice dia., in. | 0.015–0.050 | 0.015–0.030 | 0.018–0.028 |
| Position of spray header distance to bed, in. | 3–10 | 3½–8½ | 4½–5½ |
| | | (The spray nozzle should be positioned over the fastest moving portion of the bed and spray directly downward.) | |
| Rotational speed of the sulfur coating drum, % of critical speed | 30–80 | 50–70 | 65–70 |
| Substrate temp., °F | 170–203.9 | 175–203.9 | 185–195 |
| Sulfur temp., °F | 250–318 | 275–318 | 300–318 |
| Sulfur coating drum loading, % | 3–10 | 4–5.5 | 5.5 |
| Temperature of discharge from sulfur coating drum, °F | 180–225ᵃ | 195–203 | 203.8 |
| Temperature of atomizing air, °F | 250–318 | 275–318 | 300–318 |
| Volume of atomizing air, scfm/nozzle | 3–10 | 4–6 | 5.5 |
| Sulfur coating, ᵇ wt. of total | 15–40 | 15–25 | 15–20 |
| Type of spray nozzle | pneumatic atomizing | pneumatic atomizing | external mix |
| Quick Cooling | | | |
| Time of cooling | 20 min. | 5 min. | 2 min. |
| Discharge temp., °F | 150 | 125 | 100 |

ᵃWith quick cooling.
ᵇGranule weight.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by Letters Patent of the United States is:

1. In an improved process for applying a precisely uniform solid coating of fluid sulfur material sprayed onto the surface of solid urea granules in a rotary coating drum, the axis of which is in a generally horizontal attitude and having its length equal to from about 1½ to about 10 times its diameter which comprises: preparing the surface of said solid urea granules prior to their coating with said fluid sulfur sprayed thereonto to effect smooth, round granular form thereof; loading said prepared granules into said drum to about 3 to about 10 percent of its full loading capacity; heating said prepared granules in said rotary coating drum to maintain

Hydraulic Pressure Atomizing Process

| Process Variables | Limits | Preferred | Most Preferred |
|---|---|---|---|
| Preheater | Note: preheater not required when applying sulfur coating to substrate of low temperatures, e.g., 80–96°F. | | |
| Rotational speed, % of critical | 15–75 | 30–70 | 35–65 |
| Heat transferred per unit of shell area to the granules per contact, $q$, Btu/ft²-contact | 0.050–0.35 | 0.075–0.28 (values vary with size of urea being preheated) | 0.15–0.22 |
| Heat transfer rate between the drum and the granules in contact with it, $Q$, Btu/sec-ft² | | Provided the shell temperature is ≥275°F and the critical speed and drum loading are as indicated. These values must be in limits to give $q = Q(U.C.T.)$ provided | |
| Uninterrupted contact time between the preheater and the shell of the drum (U.C.T.) sec/contact | | $(U.C.T.) = \dfrac{60 \cos^{-1} \frac{r-h}{r}}{\pi R}$ | |
| Inside shell temperature, °F | ≥275 | ≥275 | ≥275 |
| Preheater drum loading, % | 5–40 | 10–35 | 20–30 |
| Preheater diameter, ft. | 0.5–10 | 2–6 | 2–4 |
| Sulfur coating | | | |
| Sulfur flow control orifice dia., in. | None | None | None |
| Position of spray header distance to bed, in. | 3–10 | 3½–8½ (The spray nozzle should be positioned over the fastest moving portion of the bed and spray directly downward unless used in connection with Blouin's invention where the nozzle would spray horizontally directly at the curtain of falling urea 2 in. above its intersection with the cascading bed.) | 4½–5½ |
| Rotational speed of sulfur-coating drum, % of critical speed | 30–80 (20–60) | 50–70 (30–55) (Using flights and curtains per Blouin's invention) | 65–70 (45–55) |
| Substrate temperature, °F | 80–190 | 130–170 | 130–160 |
| Sulfur temperature, °F | 250–318 | 275–318 | 300–318 |
| Sulfur-coating drum loading, % | 3–10 (5–20) | 4–5.5 (10–20) (Using flights and curtains per Blouin's invention) | 5.5 (12–18) |
| Temperature of discharge from sulfur-coating drum, °F | 110–200[a] | 155–190[a] | 155–180 |
| Hydraulic spraying pressure, psig | ≥300 | 500–3000 | 750–1500 |
| Sulfur coating,[b] wt. % of total | 15–40 | 15–25 | 18–23 |
| Type of spray nozzle | Hydraulic atomizing | Hydraulic atomizing with flat spray pattern and tip opening between 0.007 and 0.015 in. in dia. | |
| Quick Cooling (if desired) | | | |
| Time of cooling | 5 min. | 5 min. | None |
| Discharge temperature, °F | 130 | 130 | — |

[a] With quick cooling if above 180°.
[b] Granule wt.

the temperature thereof in the range from about 170° to about 203.9°F; rotating said loaded drum at a speed from about 30 to about 80 percent of said drum's critical speed, said critcial speed $$(RPM) = \frac{76.5}{\sqrt{D}}$$

where D represents the diameter of the drum in feet to form a rolling bed of said granules therein; applying said fluid sulfur coating material onto said rolling bed of said granules through a plurality of spray apertures of the air-atomizing type at predetermined rates in a generally vertical downward direction onto the portion of said granules in said bed to which is imparted a cascading motion by said rotation of said drum; and thereafter cooling and collecting as product the resulting sulfur coated solid granules as precisely uniform sulfur coated urea; the improvement in combination therewith for ensuring that each granule to be coated is covered by a plurality of sequentially applied streams of said fluid sulfur material, thereby forming thereon a multitude of relatively thinly applied concentrically formed layers of coating by a process which comprises the additional step of predetermining the desired flow rate from each of said spray apertures for a fixed working pressure on said fluid sulfur coating material fed thereto by means of restricting the flow of said fluid sulfur coating material to each of said spray apertures by providing orifices in the fluid system immediately upstream of each of said spray apertures, said orifice diameter ranging between 0.015 and about 0.050 inch in diameter.

2. The process of claim 1 wherein said step of preparing the surface of said solid urea granules comprises rotating a preheating drum at a speed of about 15 to about 75 percent of said preheating drum's critical speed; heating the inner shell and surface of said preheating rotary drum; introducing said substrate material particles into said preheating rotating drum in amounts ranging from 5 to 40 percent of its full load capacity to provide contact therewith said substrate material whereby a portion of the heat energy from said hot inner shell is subsequently imparted to substantially only the surface of said substrate material to cause superficial fusion of said substrate material particles to smooth same by rolling contact between said substrate material particles so heated and adjacent substrate particles; adjusting the heat input to said preheating drum to provide that the heat transferred from the hot shell of said preheating drum to the urea substrate material is represented by the following equation:

$$q = Q(U.C.T.)$$

where $q$ varies in the range from about 0.05 to about 0.35 Btu per square foot of contact area and represents the heat transferred per unit of shell area from the preheater to granules in contact with it per contact; $Q$ is the heat-transfer rate between the drum and granules in contact with it; and $(U.C.T.)$ is the uninterrupted contact time of the granules with the preheater, and where $U.C.T.$ is represented by the equation:

$$(U.C.T.) = \frac{60 \cos^{-1} \frac{r-h}{r}}{\pi R}$$

where $U.C.T.$ is the uninterrupted contact time in seconds, $R$ is the revolutions per minute of the preheater drum, $r$ is the radius of the preheater drum, and $h$ is the depth of the bed of granules; and subsequently introducing the resulting smoothed surfaced urea substrate into said rotary coating drum.

3. The process of claim 2 wherein said heat source is of the radiant energy type.

4. The process of claim 2 wherein said rolling bed in said coating drum he heated to maintain its temperature below 203.9°F, wherein the fluid coating sulfur material is heated and sprayed below 318°F and wherein the bed material in said coating drum is heated to a temperature sufficiently close to 203.9°F to assure a mosaic structure of the applied sulfur coating consisting of orthrhombic crystals in an amorphous matrix, thereby producing a slow-release fertilizer of less than 30 percent by weight dissolution of water-soluble materials in 100°F water in 7 days with a coating of less than 40 percent by weight sulfur without the addition of any other substances except sulfur to the surface of the substrate material, the sulfur-coated material, or to the sulfur to be sprayed.

5. The process of claim 4 in which the temperature of the molten sulfur fed to said coating drum is maintained in the range from about 275° to about 318°F.

6. The process of claim 4 wherein said temperature of the rolling bed is above 203.9°F, but sufficiently close to said temperature to assure said mosaic structure of the sulfur coating by subsequently rapid cooling thereof to lower the temperature of the resulting coated urea to a range from about 60° to about 150°F.

7. The process of claim 1 wherein said rolling bed is heated in said rotating coating drum to maintain its temperature below 203.9°F, wherein said fluid coating sulfur material is heated to maintain its temperature below 318°F, and wherein said bed material is heated to a temperature sufficiently close to 203.9°F to assure a mosaic structure of the applied sulfur coating consisting of orthrhombic crystals in an amorphous matrix, thereby producing a slow-release fertilizer of less than 30 percent by weight dissolution of water-soluble materials in 100°F water in 7 days with a coating of less than 40 percent by weight sulfur without the addition of any other substance except sulfur to the surface of the substrate material, the sulfur-coated material, or to the sulfur to be sprayed.

8. In an improved process for applying a precisely uniform solid coating of fluid sulfur material sprayed onto the surface of solid urea granules in a rotary coating drum, the axis of which is in a generally horizontal attitude and having its length equal to from about 1½ to about 10 times its diameter which comprises: preparing the surface of said solid urea granules prior to their coating with said fluid sulfur sprayed thereonto to effect smooth, round granular form thereof; loading said prepared granules into said drum to about 3 to about 20 percent of its full loading capacity; heating and/or cooling said prepared granules in said rotary coating drum to maintain the temperature thereof in a predetermined temperature range; rotating said loaded drum at a speed from about 20 to about 80 percent of said drum's critical speed, said critical speed $$(RPM) = \frac{76.5}{\sqrt{D}},$$

where D represents the diameter of the drum in feet to form a rolling bed and/or falling curtain of said granules therein; applying said fluid sulfur coating material onto said rolling bed and/or falling curtain of said granules through a plurality of spray apertures of the hydraulic pressure-atomizing type at predetermined rates; and thereafter cooling and collecting as product the resulting sulfur-coated solid granules as precisely uniform sulfur coated urea; the improvement in combination therewith for ensuring that each granule to be coated is covered by a plurality of sequentially applied streams of said fluid sulfur material, thereby forming thereon a multitude of relatively thinly applied concentrically formed layers of coating by a process which comprises the additional steps of:

1. maintaining the temperature of said substrate material in the range of about 80° to about 190°F;
2. maintaining the temperature of the fluid sulfur material during application onto said substrate material in the temperature range of about 250°F to about 318°F;
3. maintaining the gage pressure in said spray apertures of the hydraulic pressure-atomizing type at greater than about 300 pounds per square inch; and 4. withdrawing from the discharge end of said rotary coating drum the resulting product at a temperature in the range of about 110° to about 200°F;

said process characterized by the fact that produced therefrom is a slow-release fertilizer of less than about 50 percent by weight dissolution of water-soluble materials in 100°F water in 7 days with a coating of less than 40 percent by weight sulfur without the addition of any other substance except sulfur to the surface of the substrate material, the sulfur-coated material, or to the sulfur to be sprayed.

9. The process of claim 8 wherein said withdrawn material discharged in excess of 180°F is quick cooled to about 130°F in a period of less than about 5 minutes.

10. The process of claim 8 wherein said substrate temperature ranges from about 130° to about 170°F, the temperature of said fluid sulfur material is in the range of about 275° to about 318°F; the pressure in the spray apertures of the hydraulic pressure-atomizing type is maintained in the range from about 500 to about 3000 pounds per square inch, and the temperature of the product withdrawn from the discharge end of said rotary coating drum is maintained in the range of about 155° to about 190°F.

11. The process of claim 10 wherein said substrate temperature ranges from about 130° to about 160°F; the temperature of said fluid sulfur material is in the range of about 300° to about 318°F; the pressure in the spray apertures of the hydraulic pressure-atomizing type is maintained in the range from about 750 to about 1500 pounds per square inch; and the temperature of the product withdrawn from the discharge end of said rotary coating drum is maintained in the range of about 155° to about 180°F.

12. The process of claim 10 wherein said withdrawn material discharged in excess of 180°F is quick cooled to about 130°F in a period of less than about 5 minutes.

* * * * *

UNITED STATES PATENT OFFICE
CERTIFICATE OF CORRECTION

Patent No. 3,903,333   Dated September 2, 1975

Inventor(s) Arthur Ray Shirley, Jr., and Robert S. Meline

It is certified that error appears in the above-identified patent and that said Letters Patent are hereby corrected as shown below:

Column 2, line 66, change "provides" to -- provided --
Column 4, line 50, change "sample" to -- simple --
Column 8, line 45, last word, change "with" to -- will --
Column 15, line 10, change "spray heater" to -- spray header --;
line 63, after "box" change "from" to -- form --
Column 21, line 22, between "evaluate" and "for" insert -- process variables and performance of the equipment and to provide material --; line 23, change "meetings" to -- coatings --; Table I, under Test SCU-38A, fourth item should be -- -8+9=24.7 ·
Columns 23 and 24, at about line 2, test numbers SCU-28A, -32C, -34A, and -34B should be -- SCU-38A, -38C, -39B, -45A -- respectively; in third column opposite "Distance in bed, in." change "4-3/8" to -- 4-3/4 --
Columns 25 and 26, test numbers should be -- SCU-38A, -38C, -39B, -45A -- respectively; in column 25, line 31, change "20" to -- 29 --; line 50, change "samd" to -- same --
Column 27, line 20, between "coal" and "tar" delete the comma; line 22, change "preferred" to -- performed --; lines 27 and 28, change "dissolutions" to -- distribution --; line 64, change "coat" to -- coal --
Column 28, line 6, change "causing" to -- coating --; line 29, change "-5 +12" to -- -8 +12 --; line 57, change "useud" to -- used --
Column 29, line 31, before "10-mesh" change "minus" to -- plus --; line 64, after "resulted" change "that" to -- and --
Column 30, line 24, change "analyziz" to -- analysis --; line 32, change "tipe" to -- tips --
Columns 37 and 38, at about line 58, the notations for the retaining ring height, in., under the heading SCU-94D should be -- 3-3/8 -- and under SCU-110A -- 5 -- .

Signed and Sealed this thirtieth Day of December 1975

[SEAL]

Attest:

RUTH C. MASON
Attesting Officer

C. MARSHALL DANN
Commissioner of Patents and Trademarks